United States Patent
Inoue et al.

(10) Patent No.: US 7,943,115 B2
(45) Date of Patent: May 17, 2011

(54) POROUS 4 GROUP METAL OXIDE AND METHOD FOR PREPARATION THEREOF

(75) Inventors: Shinichi Inoue, Yokohama (JP); Hidehiko Kudou, Yokohama (JP); Akihiro Mutou, Zushi (JP); Tateo Ono, Kawasaki (JP); Toshiji Makabe, Atsugi (JP); Toru Takatsuka, Kawasaki (JP); Hisashi Nomura, Yokohama (JP)

(73) Assignee: Chiyoda Corporation, Yokohama-shi (JP)

( * ) Notice: Subject to any disclaimer, the term of this patent is extended or adjusted under 35 U.S.C. 154(b) by 1148 days.

(21) Appl. No.: 10/484,846

(22) PCT Filed: Jan. 15, 2002

(86) PCT No.: PCT/JP02/00200
§ 371 (c)(1),
(2), (4) Date: Jan. 26, 2004

(87) PCT Pub. No.: WO03/011762
PCT Pub. Date: Feb. 13, 2003

(65) Prior Publication Data
US 2004/0238410 A1 Dec. 2, 2004

(30) Foreign Application Priority Data

Jul. 27, 2001 (JP) ............................. 2001-227076
Oct. 31, 2001 (JP) ............................. 2001-333799
Oct. 31, 2001 (JP) ............................. 2001-333800

(51) Int. Cl.
*C01G 23/047* (2006.01)
(52) U.S. Cl. .................. 423/610; 423/592.1; 423/593.1
(58) Field of Classification Search ............... 423/592.1, 423/593.1, 610
See application file for complete search history.

(56) References Cited

U.S. PATENT DOCUMENTS
4,511,455 A 4/1985 Dosch et al.
(Continued)

FOREIGN PATENT DOCUMENTS
EP 0 208 434 A1 1/1987
(Continued)

OTHER PUBLICATIONS

English language abstract for Japanese patent document 05-163022, (Jun. 29, 1993).
(Continued)

*Primary Examiner* — Jessica L Ward
*Assistant Examiner* — Paul A Wartalowicz
(74) *Attorney, Agent, or Firm* — Birch, Stewart, Kolasch & Birch, LLP

(57) ABSTRACT

This invention relates to a 4 group metal oxide and to a method for preparation thereof and the 4 group metal oxide prepared by adding a particle growth inhibitor to a hydrosol a hydrogel or a dried product of a hydrous 4 group metal oxide represented by $MO_{(2-x)}(OH)_{2x}$ (wherein M denotes a 4 group metal and x is a number greater than 0.1 or x>0.1) followed by drying and calcining has a specific surface area of 80 m²/g or more, a pore volume of 0.2 ml/g or more and a pore sharpness degree of 50% or more and excellent heat stability and is useful for a catalyst or a catalyst carrier in which a catalyst metal is dispersed to a high degree. This invention further relates to a porous 4 group metal oxide and to a method for preparation thereof and the 4 group metal oxide prepared by application of a pH swing operation is characterized by a large specific surface area, excellent heat stability, high dispersion of a catalyst metal and a controlled and sharp pore distribution and is useful for a catalyst or a catalyst carrier of excellent reaction selectivity.

12 Claims, 4 Drawing Sheets

U.S. PATENT DOCUMENTS

| | | | |
|---|---|---|---|
| 4,884,396 A | 12/1989 | Miyamoto et al. | |
| 5,021,392 A | 6/1991 | Daly et al. | |
| 5,049,309 A * | 9/1991 | Sakamoto et al. | 516/90 |
| 5,633,081 A * | 5/1997 | Clough et al. | 428/331 |
| 5,830,421 A * | 11/1998 | Gardner et al. | 423/213.2 |

FOREIGN PATENT DOCUMENTS

| | | |
|---|---|---|
| JP | 56-040432 | 4/1981 |
| JP | 60-021802 A | 2/1985 |
| JP | 60-050721 B | 11/1985 |
| JP | 62-197150 A | 8/1987 |
| JP | 3-202151 A | 9/1991 |

OTHER PUBLICATIONS

English language abstract for Japanese patent document 05-139747, (Jun. 8, 1993).
English language abstract for Japanese patent document 2001-031422, (Feb. 6, 2001).
English language abstract for Japanese patent document 07-275701, (Oct. 24, 1995).
English language abstract for Japanese patent document 08-257399, (Oct. 8, 1996).
English language abstract for Japanese patent document 2000-254493, (Sep. 19, 2000).
English language abstract for Japanese patent document 2000-220038, (Aug. 8, 2000).
English language abstract for Japanese patent document 05-184921, (Jul. 27, 1993).
English language abstract for Japanese patent document 08-057322, (Mar. 5, 1996).
English language abstract for Japanese patent document 07-232075, (Sep. 5, 1995).
English language abstract for Japanese patent document 06-340421, (Dec. 13, 1994).
English language abstract for Japanese patent document 11-322338, (Nov. 24, 1999).
English language abstract for Japanese patent document 06-106061, (Apr. 19, 1994).
English language abstract for Japanese patent document 09-155197, (Jun. 17, 1997).
English language abstract for Japanese patent document 09-164334, (Jun. 24, 1997).
English language abstract for Japanese patent document 2000-079343, (Mar. 21, 2000).
English language abstract for Japanese patent document 2000-093804, (Apr. 4, 2000).
English language abstract for Japanese patent document 2000-117111, (Apr. 25, 2000).
English language abstract for Japanese patent document 2000-135437, (May 16, 2000).
English language abstract for Japanese patent document 2001-062304, (Mar. 13, 2001).
English language abstract for Japanese patent document 56-120508, (Sep. 21, 1981).
English language abstract for Japanese patent document 60-021802, (Feb. 4, 1985).
English language abstract for Japanese patent document 62-197150, (Aug. 31, 1987).
English language abstract for Japanese patent document 03-202151, (Sep. 3, 1991).
Toggari et al., J. Japan Petrol. Inst., vol. 22, No. 6, pp. 336-342, (1979).
Pourbaix, M., Atlas of Electrochemical Equilibria in Aquieous Solutions, p. 214-222, (1966).
Washburn et al., Proc. Natl. Acad. Sci., vol. 7, pp. 115-116, (1921).
Ritter et al., Industrial and Eng. Chemistry, vol. 17, No. 12, pp. 782-786, (1945).
Drake, L. C., Industrial and Eng. Chemistry, vol. 41, No. 4, pp. 780-785, (1949).
Grace, H. P., A.I.Ch.E. Journal, vol. 2, No. 3, pp. 307-336, (1956).
Brunauer et al., J. Am. Chem. Soc., vol. 60, pp. 309-319, (1938).

* cited by examiner

POROUS 4 GROUP METAL OXIDE AND METHOD FOR PREPARATION THEREOF

TECHNICAL FIELD

This invention relates to a porous 4 group metal oxide which is useful for applications such as catalyst carriers, catalysts, drying agents, adsorbents and fillers, to a method for preparation thereof and to applications thereof. In particular, this invention relates to a porous 4 group metal oxide which has a large specific surface area and exhibits excellent heat stability, to a method for preparation thereof and to applications thereof.

Further, this invention relates to a porous 4 group metal oxide consisting of high-purity porous titanium oxide which has a large specific surface area, exhibits excellent heat stability, has precisely controlled pore size and sharp pore distribution and is useful for a catalyst carrier or a catalyst and to a method for preparation thereof.

Further, this invention relates to a porous 4 group metal oxide consisting of porous titanium oxide which has a large specific surface area, exhibits excellent heat stability, has controlled pore size, exhibits high mechanical strength and is useful for a catalyst carrier or a catalyst and to a method for preparation thereof.

Still further, this invention relates to a hydrotreating catalyst consisting of a porous 4 group metal oxide of the aforementioned kind, particularly, porous titanium oxide, for hydrocarbon oils such as petroleum fractions and liquefied coal to a method for preparation thereof and to applications thereof more particularly, this invention relates to a hydrotreating catalyst comprising titanium oxide (also referred to as titanium dioxide or titania) with a large specific surface area as a catalyst carrier and the catalyst components (consisting of the principal catalyst component and promoter component and hereinafter both are collectively referred to simply as "catalyst components") which are dispersed uniformly in high concentration on the titanium oxide, to a method for preparation thereof and to applications thereof and, more specifically, this invention relates to a hydrotreating catalyst for hydrocarbon oils which is capable of removing both sulfur components and nitrogen components from hydrocarbon oils to a high degree while enhancing selective removal of nitrogen components relative to sulfur components and, at the same time, capable of markedly reducing consumption of hydrogen, to a method for preparation thereof and to applications thereof.

BACKGROUND TECHNOLOGY

The methods for preparing porous 4 group metal oxides are explained with porous titanium oxide taken as an example. The methods known today are roughly classified into two methods and one is based on combustion of titanium tetrachloride by oxygen (vapor phase method) while another is based on the preparation of hydrous titanium oxide or the precursor of titanium oxide in advance by such means as hydrolysis of titanium sulfate or titanyl sulfate, alkali neutralization of titanium tetrachloride or titanium sulfate or hydrolysis of a titanium alkoxide followed by drying and calcining the hydrous titanium oxide (liquid phase method).

Representatives of the aforementioned liquid phase methods are the following: • where the hydrolysis of titanyl sulfate is resoted to, titanyl sulfate is heated at or above 170° C. and hydrolyzed at a pressure equal to or above the prevailing saturated steam pressure to yield hydrous titanium oxide and then the hydrous titanium oxide is calcined at 400-900° C. to yield spherical anatase type titanium oxide (JP05-163,022 A); • in the case of the neutralization of titanyl sulfate, needle crystals of titanyl sulfate are contacted with an aqueous alkaline solution and the resulting needles of hydrous titanium oxide are dried and calcined to yield titanium oxide in needle crystals (JP05-139,747 A); • In case a sol-gel method involving the hydrolysis of a titanium alkoxide is adopted, a titanium tetraalkoxide and water are mixed to form a precipitate, the precipitate is filtered, washed with water, then mixed with water to form a slurry, the slurry is subjected to a hydrothermal treatment and the product thereby obtained is dried to give mesoporous titanium oxide with a pore volume of 0.1-0.5 ml/g and an average pore diameter of 3-30 nm (JP2001-031,422 A).

However, porous titanium oxide prepared by the aforementioned conventional methods generally shows extremely poor heat stability and presents the problem of suffering a rapid loss in specific surface area and failing to maintain a large surface area when subjected to calcination at high temperature or over a prolonged period of time. What happens here is that the hydroxyl groups detach themselves from hydrous titanium oxide and undergo condensation or titanium oxide being formed undergoes the so-called sintering thereby growing considerably in crystalline particles; for example, as shown in FIG. 1 which is a plot of the relationship between specific surface area and calcining temperature, crystallization or crystal transformation from amorphous to anatase and rutile takes place as the calcining temperature rises and, as a result, the specific surface area decreases rapidly which makes it difficult to maintain the specific surface area at a high level.

Under these circumstances, a catalyst carrier or a catalyst based on titanium oxide, in spite of its extremely high activity for hydrotreating per unit specific surface area, cannot maintain a large specific surface area at high temperature because of its poor heat stability nor manifest a sufficient performance as a catalyst and, unlike catalyst carriers or catalysts based on alumina or silica, has never been utilized commercially.

Where titanium oxide is intended for use as an alkylation catalyst, a high-temperature heat treatment is necessary in order to provide titanium oxide with properties of a superstrong acid; but deteriorating heat stability and diminishing specific surface area cause a decrease m the absolute amount of superstrong acid and the properties required for a catalyst could not be secured.

Where titanium oxide was intended for use as a denitrogenation catalyst of exhaust gases, it could only be used with its specific surface area limited normally to a low range of 40-50 $m^2/g$ because of its poor heat stability in spite of its excellent denitrogenation activity per unit specific surface area. Thus, the problems here were the necessity for using a large quantity of a given catalyst as well as narrowing of the range of use temperature of the catalyst caused by poor heat stability.

Moreover, where titanium oxide is used as a catalyst in the Fischer-Tropsch (FT) reaction, only titanium oxide with a small specific surface area was made available in spite of its good abrasion resistance and it has not been possible to obtain a titanium oxide-based catalyst exhibiting satisfactory performance for this particular application.

Several proposals have been made to solve the aforementioned problems. For example, attempts have been made to add a secondary component such as silica, alumina and phosphorus to titanium oxide to prepare porous titanium oxide that has a large specific surface area and shows excellent heat stability. The following are examples of such attempts.

According to a proposal made in JP07-275,701 A, a silicon compound and a titanium compound are dissolved in an acidic solution, a basic substance is then added to cause coprecipitation and the coprecipitate is aged to give silica-titanium oxide. This method regulates the ratio of titanium oxide to silica within the range of 1-50 wt % (13 wt % of titanium oxide is used in one example) and the silica-titanium oxide catalyst obtained by 3-hour calcination at 500° C. shows an extremely large specific surface area of 558 m$^2$/g.

A proposal in JP08-257,399 A is directed to the preparation of a titanium oxide-based catalyst by gelling a hydrolyzed sol of a titanium alkoxide and a silicon alkoxide with a molar ratio of $(1-x)TiO_2 \cdot xSiO_2$ (x=0-0.5) and calcining the resulting gel at 350-1200° C. The ratio of silica added to titanium oxide is low in this titanium oxide-based catalyst and, in one example, the molar ratio of titanium oxide to silica ($TiO_2$:$SiO_2$) is 0.95:0.05 and the titanium oxide catalyst prepared by 2-hour calcination at 500° C. shows a specific surface area of 160 m$^2$/g.

According to a method proposed in JP2000-254,493 A, silica-modified titanium oxide for use as a catalyst carrier is prepared by allowing a mixture of a titanium alkoxide and a silicon alkoxide to react in an alcohol solvent and calcining the reaction product. This silica-modified titanium oxide for use as a catalyst carrier has an atomic ratio Ti/Si of 5-50 and shows a BET specific surface area of 90 m$^2$/g or more even when calcined at a temperature as high as 800° C. or above. One example give the results that, when the Ti/Si atomic ratio is 10, silica-modified titanium oxide obtained by calcining at 600° C. shows a specific surface area of 185 m$^2$/g.

A proposal made in JP2000-220,038 A relates to the preparation of titanium oxide fibers containing catalyst components in the following four steps: ① a titanium alkoxide is dissolved in a solvent and allowed to undergo hydrolysis and polymerization reactions by addition of water to produce a polymer; ② the polymer is dissolved in an organic solvent to form a spinning liquid; ③ the spinning liquid is spun to form precursor fibers; ④ the precursor fibers are treated with steam before and/or during calcination. According to this method, a silicon compound is added in such an amount in the step ① or ② as to adjust the silica content preferably to 5-30 wt % and one example gives the results that the contents of silica and $V_2O_5$ are respectively 12 wt % and 19 wt % and the fibrous titanium oxide catalyst obtained after 1-hour calcination in air at 500° C. shows a specific surface area of 173 m$^2$/g.

A method for preparing an alumina-titanium oxide composite catalyst carrier is disclosed in JP5-184,921 A comprises adding a titanium hydroxycarboxylate and/or a sol of titanium oxide and hydroxide and a hydroxycarboxylic acid to oxide and/or hydroxide of aluminum so that the molar ratio of titanium oxide to alumina becomes 2.0 or less and the molar ratio of the hydroxycarboxylic acid to the aforementioned titanium oxide becomes 0.2-2.0 and calcining the kneaded mixture. In one example, a catalyst carrier prepared by calcining at 600° C. for 2 hours and showing a molar $TiO_2/Al_2O_3$ ratio of 1.53 and a molar hydroxycarboxylic acid/$TiO_2$ ratio of 1.0 shows a specific surface area of 200 m$^2$/g.

A method proposed in JP08-057,322 A for preparing a phosphorus-containing titanium oxide catalyst carrier comprises hydrolyzing a titanium salt to give a hydrated cake of titanium oxide, adding a specified amount of phosphorus to the cake, plasticizing the mixture and molding and calcining in accordance with a specified procedure to give a titanium oxide catalyst carrier containing 1-5 wt % of phosphorus computed as oxide. In an example, a titanium oxide catalyst carrier obtained by 2-hour calcination at 500° C. shows a specific surface area of 108 m$^2$/g.

A method proposed in JP07-232,075 A for preparing a catalyst for removal of nitrogen oxide comprises mixing an oxide or hydrated oxide of titanium and phosphorus so that phosphorus accounts for 0.1-6 wt % of titanium oxide in the mixture, calcining the mixture at 450-800° C. and applying vanadium to the calcined product. In an example, titanium oxide prepared by 2-hour calcination at 550° C. and containing 2.5 wt % of phosphorus relative to titanium oxide shows a specific surface area of 125 m$^2$/g before application of vanadium.

Although the aforementioned technique involving addition of a secondary component such as silica, alumina and phosphorus to titanium oxide can help to improve heat stability and give porous titanium oxide that is capable of maintaining a large surface area even after a high temperature heat treatment, the technique in question is not capable of controlling the pore size and pore distribution of porous titanium oxide sharply and the scarcity of pore sizes optimal for the reaction in the catalyst has made it difficult to obtain sufficient performance in respect to such factors as reaction selectivity, activity and catalyst life.

It is important that catalyst carriers and catalysts used in a variety of chemical reactions have not only a large specific surface area and good heat stability but also a precisely controlled pore structure in respect to pore size and pore distribution. Generally, it is important that molecules taking part in a chemical reaction diffuse readily to the active sites of a catalyst to achieve good contact and readily come off the active sites upon completion of the reaction. For this purpose, it is important that the pore size is controlled to suit the target reactants. That is to say, it is important that catalysts offer no resistance to the diffusion of the reactants and, in addition, they are devoid of too small pores which are not effective for the reaction or too large pores which are wasteful. An ideal catalyst is the one that has pores controlled to fit the aim of the reaction. For example, the effective pore diameter of a catalyst varies from reaction to reaction and it is 6-10 nm for hydrodesulfurization of gas oil, 8-15 nm for hydrodesulfurization of heavy oil, 15-30 nm for hydrodemetallization and 20-40 nm for asphaltene removal.

From the aforementioned point of view, attempts such as the following have been made to prepare porous titanium oxide having a controlled pore structure in respect to pore diameter, pore distribution and the like.

A method proposed in JP60-50,721 B for preparing porous inorganic oxides comprises a step in which a hydrosol to serve as a seed is obtained, a step in which the pH of the hydrosol is swung between the hydrosol-dissolving range and the hydrosol-precipitating range (pH swing operation) thereby causing growth of crystals and coarsely agglomerating the hydrosol and a step in which the coarse agglomerate of the hydrosol is dried and calcined to give a metal oxide. This method can surely yield titanium oxide with a sharply controlled pore distribution; however, it was difficult by this method alone to prepare a titanium oxide catalyst which shows no decrease in specific surface area nor loss of activity as a result of heat history involving heat applied to calcination in the catalyst preparation and reaction heat evolved in the reaction system.

A method proposed in JP06-340,421 A for preparing porous titanium oxide consists of adding ammonia water to a hydrolyzable titanium compound, for example, titanium tetrachloride, to form hydrated titanium oxide, adding a polybasic carboxylic acid to the hydrated titanium oxide to form a chelate, shifting the pH from acidic to neutral by an alkali to separate an organic titanium oxide compound, deflocculating the resulting organic titanium oxide compound with an inorganic acid and further calcining the deflocculated product to give porous titanium oxide. There is a description in an example that porous titanium oxide obtained by 24-hour calcination at 300° C. shows a total pore volume of 0.348 ml/g, a BET specific surface area of 112 m$^2$/g and a pore radius in the range of 20-500 Å, mainly in the range of 32-120 Å with the main peak appearing at 120 Å, and it has a larger surface area and a less broad pore distribution than commercially available titanium oxide. However, this method has limited the calcining temperature to a low level of 300° C. in order to maintain a high specific surface area and, besides, the main pores exist in a broad range of 32-120 Å as expressed in pore radius.

A method proposed in JP11-322,338 A for preparing porous titanium oxide with a well-controlled fine structure consists of preparing a titanium-metal composite compound by adding to a solution of a titanium alkoxide in a watermiscible organic solvent one kind or two kinds or more of salts formed by neutralization of a weak acid with a weak base, a weak acid with a strong base or a weak base with a strong acid, water, and one kind or two kinds or more of salts of rare earth metals, and then removing the metal from the composite compound by an acid treatment, if necessary in the presence of a hydrolysis inhibitor. There is a description in an example that porous titanium oxide obtained after 2-hour calcination at 600° C. shows a specific surface area of 90 m$^2$/g or more but a broad pore distribution in the range of 100-600 Å.

Moreover, in the case where porous titanium oxide is used as a catalyst, it is necessary for titanium oxide to have high purity for full manifestation of its catalytic properties.

According to Togari et al. [Togari, O., Ono, T. and Nakamura, M; Sekiyu Gakkaishi 22, (6), 336 (1979)], a catalyst carrier that is a composite compound of $Al_2O_3 \cdot TiO_2$ or $SiO_2 \cdot TiO_2$ shows an increasingly greater acid strength as the content of $Al_2O_3$ or $SiO_2$ increases. Further, as described in JP08-57,322 A, strong acid sites develop as the content of phosphorus in titanium oxide increases. Consequently, strong acid sites on the catalyst facilitate formation of coke and deactivation of the catalyst in the hydrodesulfurization of petroleum fractions and, according to the studies conducted by the inventors of this invention, the purity of titanium oxide on the oxide ($TiO_2$) basis is 97 wt % or more, preferably 98 wt % or more, in order to maintain a high desulfurization activity per unit specific surface area which is characteristic of titanium oxide and to suppress formation of coke.

By the way, sulfur components and nitrogen components contained in hydrocarbon oils derived from petroleum or coal are converted to sulfur oxides and nitrogen oxides when the hydrocarbon oils are burned as fuel. They cause air pollution when discharged into air or they act as catalyst poisons when formed in the decomposition or conversion reactions of the hydrocarbon oils thereby lowering the efficiency of these reactions. Furthermore, sulfur components in fuel oils for transportation are also poisons for those catalysts which treat exhaust gases discharged from gasoline- and diesel-driven vehicles.

Under the circumstances, hydroprocessing has been practiced to remove sulfur components and nitrogen components from hydrocarbon oils and a large number of hydrotreating catalysts useful for hydroprocessing have been proposed, for example, such catalysts consist of metals possessing catalytic activity for hydrotreating such as molybdenum (Mo), tungsten (W), cobalt (Co) and nickel (Ni) and catalyst carriers such as alumina, zeolite-alumina, alumina-titanium oxide and phosphorus-silica-alumina as disclosed in JP6-106,061 A, JP9-155,197 A, JP9-164,334 A, JP2000-79,343 A, JP2000-93,804A, JP2000-117,111 A, JP2000-135,437 A and JP2001-62,304A.

Generally, a catalyst consisting of molybdenum and cobalt supported on a catalyst carrier is mainly used where the removal of sulfur components (desulfurization) from hydrocarbon oils is the major objective while a catalyst consisting of molybdenum or tungsten and nickel supported on a catalyst carrier is mainly used where the desulfurization and additionally the removal of nitrogen (denitrogenation) are the objectives. The use of nickel here is said to be due to its high capability of hydrogenating aromatic compounds.

The greater part of nitrogen components in hydrocarbon oils occurs as aromatic compounds and, when the removal of the nitrogen-containing aromatic compounds is effected by hydroprocessing, the hydrogenation of the aromatic rings takes place and the rupture of C—N bonds ensues. Thus, the denitrogenation reaction progresses via elimination of nitrogen as ammonia. For this reason, an enhanced capability of hydrogenating aromatic compounds is required in the denitrogenation reaction. As a results, there rises a problem of an increased consumption of hydrogen when hydrocarbon oils are hydrorefined in the presence of a hydrotreating catalyst containing nickel.

The 4th Report of the Central Environmental Council of the Ministry of the Environment, Japan, entitled "What the countermeasures should be for reduction of automobile exhaust gases in the future" presented in November, 2000 states that it is appropriate to reduce the sulfur components in gas oil or fuel oil for diesel engines from the current level of 500 ppm to 50 ppm by the fiscal year 2004 and a still further reduction of sulfur components is desirable in the future. As for the nitrogen components in hydrocarbon oils such as gas oil, they not only deteriorate the quality of product oil by coloration but also poison and deteriorate hydrotreating catalysts during hydroprocessing and they should desirably be removed as much as possible.

However, hydroprocessing by the use of the aforementioned conventional hydrotreating catalysts does not necessarily give sufficient performance in desulfurization and denitrogenation and it becomes necessary to conduct hydroprocessing under severer conditions in order to reduce the sulfur components in gas oil to 50 ppm or less. For example, it would be necessary to reduce the throughput to ⅓ or to roughly treble the amount of the catalyst. Reduced throughput would call for a critical review of the production schedule of an oil refinery while an increase in the amount of catalyst would require additional installation of, say, two reactors. Or, it would be necessary to raise the reaction temperature by 20° C. or more and this would be done at a great sacrifice of the catalyst life. These measures would forcibly incur a great deal of economic burden. Moreover, it is difficult to remove nitrogen components by hydroprocessing to the same extent as in the case of sulfur components and any attempt to effect hydroprocessing to remove nitrogen components at a high rate would require excessive consumption of hydrogen and this would necessitate installation of a new apparatus for producing hydrogen at an oil refinery where excess hydrogen is barely available.

As described above, it is not possible to prepare a desulfurization catalyst of high activity and this is for the following reason: in a hydrotreating catalyst consisting of the principal catalyst component molybdenum and the promoter component cobalt and a catalyst carrier mainly composed of alumina, the amount of molybdenum is normally 25 wt % or less on the oxide basis and any attempt to increase molybdenum any further would cause agglomeration of molybdenum on the catalyst carrier and this would prevent molybdenum from undergoing high dispersion and effectively manifesting catalytic performance and would additionally produce such adverse effects as blocking pores and decreasing surface area and pore volume thereby failing to exhibit a needed activity.

DISCLOSURE OF THE INVENTION

The inventors of this invention have conducted extensive studies on porous 4 group metal oxides of excellent heat stability, a large specific surface area and a high dispersion of a catalyst metal come to the following finding and completed this invention; adding a particle growth inhibitor to a hydrosol a hydrogel or a dried product of a hydrous 4 group metal oxide represented by the general formula $MO_{(2-x)}(OH)_{2x}$ (wherein M denotes a 4 group metal and x is a number greater than 0.1 or x>0.1) followed by drying and calcining gives a porous 4 group metal oxide which has a specific surface area of 80 m$^2$/g or more, a pore volume of 0.2 ml/g or more and a pore sharpness degree of 50% or more, shows excellent heat stability and contains a highly dispersed catalyst metal and, moreover, application of a pH swing operation can produce a porous 4 group metal oxide which has a controlled and sharp pore distribution and is useful as a catalyst or a catalyst carrier of excellent reaction selectivity.

Further, the inventors of this invention have found that adding one kind or two kinds of more of compounds that yield ions containing an element selected from silicon (Si), phosphorus (P), magnesium (Mg), calcium (Ca), barium (Ba), manganese (Mn), aluminum (Al) and zirconium (Zr) in a very small amount as a particle growth inhibitor to a hydrosol, a hydrogel or a dried product of a hydrous 4 group metal oxide represented by the general formula $MO_{(2-x)}(OH)_{2x}$ (wherein M denotes a 4 group metal and x is a number greater than 0.1 or x>0.1) followed by drying and calcining gives porous titanium oxide which has a large specific surface area of 80 m$^2$/g or more even when calcined at 500° C. for 3 hours, exhibits excellent heat stability, has controlled pore size and shows a purity as high as 97 wt % or more and completed this invention. That is, an ion exchange takes place between the thermally readily detachable hydroxyl ions of hydrous titanium oxide particles whose pore diameter is precisely controlled and thermally difficulty detachable polyvalent ions of the aforementioned elements and, further, the polyvalent ions of the aforementioned elements which have undergone an ion exchange can produce, because of their steric effect, an effect for preventing the nearby hydroxyl groups from detaching themselves and participating in condensation polymerization; this can effectively suppress or prevent the hydroxyl groups from coming off the hydrous titanium oxide particles and the particles from growing further and completed this invention.

Further the inventors of this invention have found that synthesizing hydrous titanium oxide which is controlled to have sharp pore distribution and, at the same time, further controlled to contain micropores in a specified range to make the pore distribution asymmetric followed by drying and calcining gives porous titanium oxide which is controlled to have an arbitrary pore diameter, has a pore distribution in a shape conforming to the molecular weight distribution of the reactants, has a larger specific surface area than porous titanium oxide which is controlled to have a uniform particle diameter and exhibits high mechanical strength and completed this invention.

Still further, the inventors of this invention have found that the aforementioned porous 4 group metal oxide, in particular, porous titanium oxide, when prepared by adding two kinds or more of compounds that yield ions containing elements possessing catalytic activity for hydrotreating, preferably two kinds or more of compounds that yield ions containing elements constituting the principal catalyst component and promoter component, as a particle growth inhibitor to a hydrosol a hydrogel or a dried product of hydrous titanium oxide represented by the general formula $MO_{(2-x)}(OH)_{2x}$ (wherein M denotes a 4 group metal and x is a number greater than 0.1 or x>0.1), the composition formula $TiO_{(2-x)}(OH)_{2x} \cdot yH_2O$ (wherein $0.1 \leq x < 2.0$ and $0.3 \leq y \leq 40$) or the composition formula $TiO_{(2-x)}(OH)_{2x} \cdot yH_2O$ (wherein $0.2 \leq x < 1.0$ and $0.3 \leq y \leq 40$) followed by drying and calcining, is useful as a hydrotreating catalyst for hydrocarbon oils, performing excellently not only in desulfurization but also in denitrogenation and achieving reduction of sulfur and nitrogen contents on a commercial scale without requiring excessive consumption of hydrogen and completed this invention.

Accordingly, an object of this invention is to provide a porous 4 group metal oxide which shows excellent heat stability, has a large specific surface area and contains a high dispersion of a catalyst metal and to provide a method for preparation thereof.

Another object of this invention is to provide a porous 4 group metal oxide which has a precisely controlled pore size and a sharp pore distribution in addition to excellent heat stability, a large specific surface area and a high dispersion of a catalyst metal and is useful as a catalyst or a catalyst carrier of excellent reaction selectivity and to provide a method for preparation thereof.

A further object of this invention is to provide high-purity porous titanium oxide which has a large specific surface area, shows excellent heat stability and has pores precisely controlled in size and distributed sharply and to provide a method for preparation thereof. Precise control of pore size also means uniform and precise control of the diameter of titanium oxide particles.

A further object of this invention is to provide porous titanium oxide which is controlled to have an arbitrary pore diameter, has a pore distribution in a shape conforming to the molecular weight distribution of the reactants, has a larger specific surface area than porous titanium oxide that is controlled to have a uniform pore diameter and shows high mechanical strength.

A further object of this invention is to provide a hydrotreating catalyst for hydrocarbon oils which performs excellently in desulfurization and denitrogenation and requires minimal consumption of hydrogen.

A further object of this invention is to provide a hydrotreating catalyst for hydrocarbon oils which performs excellently not only in desulfurization but also in denitrogenation and can advantageously achieve reduction of sulfur and nitrogen components on a commercial scale while avoiding excessive consumption of hydrogen in the course of hydroprocessing and to provide a method for preparation thereof.

A further object of this invention is to provide a hydroprocessing method which makes use of a hydrotreating catalyst for hydrocarbon oils possessing excellent activity for both desulfurization and denitrogenation and consuming a not too excessive amount of hydrogen and accomplishes a high degree of removal of both sulfur and nitrogen components from hydrocarbon oils.

Accordingly, this invention relates to a 4 group metal oxide obtained by adding a particle growth inhibitor to a hydrosol a hydrogel or a dried product of a hydrous 4 group metal oxide represented by the general formula $MO_{(2-x)}(OH)_{2x}$ (wherein M denotes a 4 group metal and x is a number greater than 0.1 or x>0.1), followed by drying and calcining and the product occurs as a porous 4 group metal oxide having a specific surface area of 80 m²/g or more, a pore volume of 0.2 ml/g or more and a pore sharpness degree of 50% or more. Of the aforementioned hydrous 4 group metal oxides represented by the general formula $MO_{(2-x)}(OH)_{2x}$, a preferred case is where the 4 group metal M is titanium (Ti) and the hydrous 4 group metal oxide in question is hydrous titanium oxide and, still more, the hydrous titanium oxide is represented either by the composition formula $TiO_{(2-x)}(OH)_{2x} \cdot yH_2O$ (wherein $0.1 \leq x < 2.0$ and $0.3 \leq y \leq 40$) or by the composition formula $TiO_{(2-x)}(OH)_{2x} \cdot yH_2O$ (wherein $0.2 \leq x < 1.0$ and $0.3 \leq y \leq 40$).

Further, this invention relates to a method for preparing porous 4 group metal oxide which comprises adding a particle growth inhibiter to a hydrosol a hydrogel or a dried product of a hydrous 4 group metal oxide obtained by the reaction of a 4 group metal compound as a raw material with a pH adjusting agent in an aqueous solvent and represented by the general formula $MO_{(2-x)}(OH)_{2x}$ (wherein M denotes a 4 group metal and x is a number greater than 0.1 or x>0.1) followed by drying and calcining. Of the aforementioned hydrous 4 group metal oxides represented by the general formula $MO_{(2-x)}(OH)_{2x}$, a preferred case is where the 4 group metal M is titanium (Ti) and the hydrous 4 group metal oxide in question is hydrous titanium oxide and, still more, the hydrous titanium oxide is represented either by the composition formula $TiO_{(2-x)}(OH)_{2x} \cdot yH_2O$ (wherein $0.1 \leq x < 2.0$ and $0.3 \leq y \leq 40$) or by the composition formula $TiO_{(2-x)}(OH)_{2x} \cdot yH_2O$ (wherein $0.2 \leq x < 1.0$ and $0.3 \leq y \leq 40$).

Further, this invention relates to a hydrotreating catalyst for hydrocarbon oils comprising a porous 4 group metal oxide obtained by the use of a compound that yields ions containing an element having a catalytic activity for hydrotreating as a particle growth inhibiter. Particularly preferable here is a hydrotreating catalyst for hydrocarbon oils in which the 4 group metal M is titanium (Ti).

Still further, this invention relates to a method for hydroprocessing hydrocarbon oils which comprises bringing hydrocarbon oils into contact with the aforementioned hydrotreating catalyst in the presence of hydrogen under the hydrotreating conditions of a reaction temperature of 280-400° C., a reaction pressure of 2-15 MPa, an LHSV of 0.3-10 hr$^{-1}$ and a hydrogen/oil ratio of 50-500 Nl/l for removal of sulfur and nitrogen components from the hydrocarbon oils.

Depending upon the mode of practice, this invention can typically be described in the following manner.

Firstly, this invention relates to a porous 4 group metal oxide which is obtained by adding a particle growth inhibiter to a hydrosol a hydrogel or a dried product of a hydrous 4 group metal oxide represented by the general formula $MO_{(2-x)}(OH)_{2x}$ (wherein M denotes a 4 group metal and x is a number greater than 0.1 or x>0.1) following by drying and calcining, has a specific surface area of 80 m²/g or more, a pore volume of 0.2 ml/g or more and a pore sharpness degree of 50% or more, shows excellent heat stability, has a high dispersion of a catalyst metal and is useful as a catalyst or a catalyst carrier. Further, this invention relates to a porous 4 group metal oxide which is obtained by application of a pH swing operation, has a large specific surface area, shows excellent heat stability, has a high dispersion of a catalyst metal and a controlled and sharp pore distribution and is useful as a catalyst or a catalyst carrier of excellent reaction selectivity and to a method for preparation thereof.

Secondly, this invention relates to porous titanium oxide which is obtained by adding one kind or two kinds or more of compounds that yield ions containing elements selected from silicon (Si), phosphorus (P), magnesium (Mg), calcium (Ca), barium (Ba), manganese (Mn), aluminum (Al) and zirconium (Zr) in a very small amount as a particle growth inhibiter to a hydrosol, a hydrogel or a dried product of hydrous titanium oxide represented by the general formula $TiO_{(2-x)}(OH)_{2x}$ (wherein x is a number greater than 0.1 or x>0.1) following by drying and calcining, is characterized by a large surface area, excellent heat stability and controlled pore diameter as proved by having a specific surface area of 80 m²/g or more, a pore volume of 0.2 ml/g or more and a pore sharpness degree of 50% or more even when calcined at 500° C. for 3 hours, shows a purity of 97 wt % or more and is useful as a catalyst or a catalyst carrier and to a method for preparation thereof.

Thirdly, this invention relates to porous titanium oxide which is obtained by synthesizing hydrous titanium oxide which is controlled to have a sharp pore distribution and, at the same time, controlled to contain micropores in a specified range to make the pore distribution asymmetric followed by drying and calcining, has a pore asymmetric coefficient N in the range of $1.5 \leq N \leq 4$ as defined by the equation $N=(A-C)/(B-A)$ (wherein A is the logarithmic value of the median diameter, B is the logarithmic value of the pore diameter of the 2% pore volume and C is the logarithmic value of the pore diameter of the 98% pore volume), is controlled to have an arbitrary pore diameter and a pore distribution in a shape conforming to the molecular weight distribution of the reactants, has a larger specific surface area than porous titanium oxide which is controlled to have a uniform particle diameter and shows good mechanical strength and to a method for preparing such porous titanium oxide; the method involves a pH swing operation during the synthesis of hydrous titanium oxide and the pH swing operation is performed in the non-dissolving pH range of hydrous titanium oxide between the range on the low pH side ($1 < pH \leq 4$) and the pH range near the isoelectric point of hydrous titanium oxide ($5.1 \leq pH \leq 7.1$) or between the pH range near the isoelectric point of hydrous titanium oxide ($5.1 \leq pH \leq 7.1$) and the range on the high pH side ($8 \leq pH \leq 12$) according to one mode of practice or the pH swing operation is performed in the non-dissolving pH range of hydrous titanium oxide between the range on the low pH side ($1 < pH \leq 4$) and the range across the pH range near the isoelectric point of hydrous titanium oxide ($5.1 \leq pH \leq 7.1$) or between the range on the high pH side ($8 \leq pH \leq 12$) and the range across the pH range near the isoelectric point of hydrous titanium oxide ($5.1 \leq pH \leq 7.1$) while allowing a sufficient aging time for growth of particles in the pH range near the isoelectric point of hydrous titanium oxide ($5.1 \leq pH \leq 7.1$) according to another mode of practice.

Fourthly, this invention relates to a hydrotreating catalyst which is a catalyst supported on titanium oxide obtained by adding at least two kinds or more of compounds selected from compounds yielding ions containing elements possessing catalytic activity for hydrotreating, preferably two kinds or more of compounds constituting the principal catalyst component and promoter component, as a particle growth inhibiter to a hydrosol a hydrogel or a dried product of hydrous titanium oxide represented by the general formula $TiO_{(2-x)}(OH)_{2x}$ is a number greater than 0.1 or x>0.1), the composition formula $TiO_{(2-x)}(OH)_{2x} \cdot yH_2O$ (wherein $0.1 \leq x < 2.0$ and $0.3 \leq y \leq 40$) or the composition formula $TiO_{(2-x)}(OH)_{2x} \cdot yH_2O$ (wherein $0.2 \leq x < 1.0$ and $0.3 \leq y \leq 40$) thereby exchanging the hydroxyl groups of the hydrous titanium oxide with the ions of these elements followed by drying and calcining and has a specific surface area of 80 m²/g or more, a pore volume of 0.2 ml/g or more and a pore sharpness degree of 50% or more, shows excellent desulfurization and denitrogenation performance and acts as a hydrotreating catalyst for hydrocarbon oils with minimal consumption of hydrogen and to a method for preparation thereof. Furthermore, this invention relates to a method for hydroprocessing hydrocarbon oils by the use of the aforementioned catalyst.

Here, hydrous titanium oxide represented by the general formula $TiO_{(2-x)}(OH)_{2x}$ or the composition formula $TiO_{(2-x)}(OH)_{2x} \cdot yH_2O$ can be divided into the portion of structural water chemically bonded to hydrous titanium oxide written as $TiO_{(2-x)}(OH)_{2x}$ and the portion of free water physically coexisting with hydrous titanium oxide written as $yH_2O$. In this invention, the amount of structural water is defined as the change in weight between drying and calcining when hydrous titanium oxide is dried at 120° C. for 3 hours and then further calcined at 500° C. for 3 hours. On the other hand, the amount of free water written as $yH_2O$ is defined as the change in weight between undried hydrous titanium oxide and dried titanium oxide.

In a hydrosol a hydrogel or a dried product of a hydrous 4 group metal oxide represented by the general formula $MO_{(2-x)}(OH)_{2x}$ (wherein M denotes a 4 group metal and x is a number greater than 0.1 or x>0.1) in this invention, "x>0.1" means that the lower limit of the OH groups possessed by a hydrosol a hydrogel or a dried product of a hydrous 4 group metal oxide exceeds 0.1, but preferably $0.1 \leq x<2.0$, more preferably $0.2 \leq x<1.0$. Growth of particles occurs by sintering and condensation as the OH groups detach themselves from a hydrosol, a hydrogel or a dried product of a hydrous 4 group metal oxide as a result of heat history and replacement of the substitutable OH groups with other functional groups increases heat stability and the specific surface area. In consequence, it is also possible to use a hydrous 4 group metal oxide which is prepared by the methods generally used up to the present such as hydrolysis, neutralization and sol-gel method.

A preferred hydrous 4 group metal oxide is the one in which the 4 group metal M is titanium (Ti) and is represented preferably by the general formula $TiO_{(2-x)}(OH)_{2x}$ (wherein x is a number greater than 0.1 or x>0.1), the composition formula $TiO_{(2-x)}(OH)_{2x} \cdot yH_2O$ (wherein $0.1 \leq x<2.0$ and $0.3 \leq y \leq 40$) or the composition formula $TiO_{(2-x)}(OH)_{2x} \cdot yH_2O$ (wherein $0.2 \leq x<1.0$ and $0.3 \leq y \leq 40$). When the value of x in the aforementioned formulas is 0.1 or less, it becomes difficult to obtain a large specific surface area because of the growth of hydrous titanium oxide crystals and to attain a high dispersion of the catalyst components uniformly in high concentration because of the decrease in the hydroxyl groups on the surface of hydrous titanium oxide ion-exchangeable with the catalyst components. Conversely, when x is 2.0 or more, the crystals of hydrous titanium oxide do not form which makes it impossible to obtain a hydrosol or a hydrogel of hydrous titanium oxide in some cases; although the presence of a large number of hydroxyl groups ion-exchangeable with the catalyst components is desirable from the viewpoint of supporting the catalyst components on a catalyst carrier, the crystal particles of hydrous titanium oxide are small and amorphous when examined by X-ray and the catalyst obtained after drying and calcining has an inadequate pore structure or an inferior quality as a hydrotreating catalyst in other cases. When y is less than 0.3 in the aforementioned formulas, hydrous titanium oxide is in the nearly dry condition and it is difficult to obtain a uniform and high dispersion of the catalyst components under such condition; moreover, when a solution containing the catalyst components is added to hydrous titanium oxide particles and stirred, the dispersion of the catalyst components progresses with difficulty because of agglomeration of the hydrous titanium oxide particles and it is difficult to obtain a uniform and high dispersion in this case. As a result, a uniform and high dispersion is not possible to attain when the catalyst components need to be supported on titanium oxide in high concentration and the catalyst components form an agglomerate or a lump with the resultant low catalytic activity. Conversely, when y is in excess of 40, the amount of free water that is not structural water of hydrous titanium oxide becomes excessive and hydrous titanium oxide cannot be molded or, even if molded, the molded form becomes difficult to maintain. A solution containing the catalyst components becomes diluted when added to hydrous titanium oxide containing excessive free water and the catalyst components mostly do not undergo ion exchange and are wasted.

The raw materials 4 group metal compounds useful for the preparation of a hydrosol a hydrogel or a dried product of a hydrous 4 group metal oxide include the following: chlorides, fluorides, bromides, iodides, nitrates, sulfates, carbonates, acetates, phosphates, borates, oxalates, hydrofluoric acid salts, silicates and iodates of 4 group metals such as titanium (Ti), zirconium (Zr) and hafnium (Hf); oxoacid salts such as titanates, zirconates and hafnates of 4 group metals; and alkoxides of 4 group metals. Of these compounds of 4 group metals, particularly preferable in the case of titanium (Ti) compounds are titanium tetrachloride, titanium sulfate, titanyl sulfate, titanium trichloride, titanium methoxide, titanium ethoxide, titanium propoxide, titanium isopropoxide, titanium tetraisopropoxide, titanium tetrabutoxide, orthotitanic acid, metatitanic acid, titanium tetrabromide, titanium tetrafluoride, titanium trifluoride, potassium titanate, sodium titanate and barium titanate. Likewise, particularly preferable in the case of zirconium (Zr) compounds are zirconium tetrachloride, zirconium oxychloride, zirconium sulfate, zirconium nitrate, zirconium acetate, zirconium acetylacetate, zirconium propoxide and zirconium t-butoxide. Particularly preferable in the case of hafnium compounds are hafnium chloride, hafnium sulfate and hafnium oxychloride. These raw materials 4 group metal compounds may be used singly or as a mixture of two kinds or more.

The pH adjusting agents to be used in the synthesis of the aforementioned hydrous 4 group metal oxides include the salts of the corresponding 4 group metals such as chlorides, fluorides, bromides, iodides, nitrates, sulfates, carbonates, acetates, phosphates, borates, oxalates, hydrofluoric acid salts, silicates and iodates and also include those compounds (salts) which are added as a particle growth inhibiter to be explained below and a variety of acids and alkalis.

Concrete examples of titanium salts suitable for use as a pH adjusting agent in the synthesis of hydrous titanium oxide are titanium tetrachloride, titanium sulfate, titanyl sulfate, titanium trichloride, titanium tetrabromide, titanium tetrafluoride and titanium trifluoride. Examples of the compounds (salts) to be added as a particle growth inhibiter are ferrous sulfate, ferric sulfate, ferrous chloride, ferric chloride, ferrous nitrate, ferric nitrate, nickel nitrate, nickel sulfate, nickel chloride, cobalt nitrate, cobalt sulfate, cobalt chloride, manganese nitrate, manganese sulfate, manganese chloride, yttrium nitrate, yttrium sulfate and yttrium chloride. Examples of the acids are nitric acid ($HNO_3$), hydrochloric acid (HCl), sulfuric acid ($H_2SO_4$), carbonic add ($H_2CO_3$), formic add (HCOOH) and acetic add ($CH_3COOH$). Examples of the alkalis are ammonia ($NH_3$), sodium hydroxide (NaOH), potassium hydroxide (KOH), sodium carbonate ($Na_2CO_3$), potassium carbonate ($K_2CO_3$), sodium hydrogencarbonate ($NaHCO_3$) and potassium hydrogencarbonate ($KHCO_3$). These pH adjusting agents may be used singly or as a mixture of two kinds or more.

The aqueous solvents to be used in the synthesis of hydrous 4 group metal oxides is not restricted and water and aqueous solutions of water-soluble organic solvents such as methanol ethanol propanol tetrahydrofuran, acetone and dioxane may be used.

A hydrosol a hydrogel or a dried product of the aforementioned hydrous 4 group metal oxides can be synthesized by the reaction of one of the aforementioned raw materials 4 group metal compounds with a pH adjusting agent in an aqueous solvent. For example, hydrous titanium oxide is synthesized by hydrolyzing a titanium compound selected from the aforementioned raw materials by an acid or alkali selected from the aforementioned pH adjusting agents or neutralized by an alkali in an aqueous solvent.

In the hydrolysis or alkali neutralization of a raw material titanium compound, the concentration of titanium in the aqueous solvent is normally 0.1-15 wt %, preferably 0.5-10 wt %, more preferably 0.5-6 wt %, computed as titanium oxide ($TiO_2$), the reaction temperature ranges from room temperature to 300° C., preferably from room temperature to 180° C., more preferably from room temperature to 100° C., the reaction pressure ranges from normal pressure (0 MPa) to 9.0 MPa, preferably from 0 to 3.0 MPa, more preferably from 0 to 0.9 MPa, and the pH is selected suitably in order to control the pore structure to have it adapted to the object to which titanium oxide is used.

In this invention, in order to obtain a porous 4 group metal oxide which has a controlled pore structure in respect to pore diameter, pore distribution and the like, a pH swing operation is performed between the ranges of different pH plural times in an aqueous solvent by the use of a 4 group metal compound as a raw material and a pH adjusting agent in the synthesis of a hydrosol a hydrogel or a dried product of the aforementioned hydrous 4 group metal oxide.

In particular, the aforementioned pH swing operation is performed preferably between the precipitating pH range and the dissolving pH range of the hydrous 4 group metal oxide in order to obtain porous 4 group metal oxide in which the pores are precisely controlled in size and distributed sharply. For example, in the synthesis of a hydrosol or a hydrogel of hydrous titanium oxide, the pH is swung alternately between the precipitating pH range and the dissolving pH range of hydrous titanium oxide shown in the electrochemical potential diagram of titanium oxide [M. Pourbaix, "Atlas of Electrochemical Equilibria in Aqueous Solution," Pergamon Press, London (1966)] plural times, normally 2-20 times, and the pore structure involving such factors as pore diameter and pore distribution of the hydrous titanium oxide particles being synthesized can be controlled increasingly more precisely by regulating the pH in the precipitating range, the pH in the dissolving range and the number of swings. For example, the peak of pore diameter appears at 8.2 nm in the pore distribution when the pH swing operation is performed twice between pH 1 and pH 7 while the peak appears at 16.1 nm when the pH swing operation is performed four times between pH 1 and pH 7; thus it is possible to prepare porous titanium oxide with a strictly controlled pore structure.

In the case where high mechanical strength is required for a porous 4 group metal oxide in which the 4 group metal M is titanium (Ti), it is preferable to perform the aforementioned pH swing operation as follows: ① the operation is performed in the range of the non-dissolving pH range of hydrous titanium oxide ($1<pH\leq12$) in the electrochemical potential diagram of titanium oxide between the range on the low pH side ($1<pH\leq4$) and the pH range near the isoelectric point of hydrous titanium oxide ($5.1\leq pH\leq7.1$) from the range on the low pH side or between the pH range near the isoelectric point ($5.1\leq pH\leq7.1$) and the range on the high pH side ($8\leq pH\leq12$); ② the operation is performed in the non-dissolving pH range ($1<pH\leq12$) between the range on the low pH side ($1<pH\leq4$) and the range across the pH range near the isoelectric point ($5.1\leq pH\leq7.1$) or between the range on the high pH side ($8\leq pH\leq12$) and the range across the pH range near the isoelectric point ($5.1\leq pH\leq7.1$) from the range on the high pH side while allowing a sufficient aging time for growth of particles. This procedure is suitable for the preparation of porous titanium oxide whose pore asymmetric coefficient N defined by $N=(A-C)/(B-A)$ (wherein A is the logarithmic value of the median diameter, B is the logarithmic value of the pore diameter of the 2% pore volume and C is the logarithmic value of the pore diameter of the 98% pore volume) falls in the range of $1.5\leq N\leq4$.

In this invention, a particle growth inhibitor is added to a hydrosol a hydrogel or a dried product of a hydrous 4 group metal oxide synthesized in the aforementioned manner and the mixture is dried and calcined to give a porous 4 group metal oxide.

Addition of a particle growth inhibitor to a hydrosol a hydrogel or a dried product of hydrous titanium oxide represented by the general formula $TiO_{(2-x)}(OH)_{2x}$ (wherein x is a number greater than 0.1 or $x>0.1$) followed by drying and calcining gives porous titanium oxide which has a large specific surface area and shows excellent heat stability as proved by having a specific surface area of 80 $m^2$/g or more, a pore volume of 0.2 ml/g or more and a pore sharpness degree of 50% or more even when calcined at a temperature as high as 500° C. for 3 hours, has a controlled pore diameter, exhibits a high purity of 97 wt % or more and is useful for a catalyst or a catalyst carrier; particle growth inhibitors suitable for the preparation of the aforementioned porous titanium oxide are compounds that yield ions containing elements selected from silicon (Si), phosphorus (P), magnesium (Mg), calcium (Ca), barium (Ba), manganese (Mn), aluminum (Al) and zirconium (Zr) and these compounds may be used singly or as a mixture of two kinds or more. Importantly, any compound which is added as a particle growth inhibitor to a hydrous 4 group metal oxide, particularly, to hydrous titanium oxide, is required to be effective for maintaining the specific surface area of hydrous titanium oxide at a high level not to interfere with the control of pore distribution of titanium oxide, not to become a catalyst poison by remaining as its oxide in porous titanium oxide and to be inexpensive from the economical point of view.

A plausible mechanism by which the compounds that yield ions containing the aforementioned elements act as a particle growth inhibitor against a hydrosol a hydrogel or a dried product of hydrous titanium oxide is as follows. Fine particles of hydrous titanium oxide become charged with electricity in an aqueous solution and the isoelectric point in the case of anatase crystals is near pH 6.1. In a solution whose pH is short of the isoelectric point, the hydroxyl groups on the surface of the hydrous titanium oxide particles are charged positively and anions in the solution readily adhere to the surface of the hydrous titanium oxide particles. On the other hand, in a solution whose pH exceeds the isoelectric point, the hydroxyl groups on the surface of the hydrous titanium oxide particles are charged negatively and cations in the solution readily adhere to the surface of the hydrous titanium oxide particles. In a case such as this, the anions or cations in the solution disperse to a high degree on the surface of hydrous titanium oxide particles by the electrostatic action and bond effectively and firmly to the hydroxyl groups on the surface even when their amounts are small relative to that of the hydroxyl groups. For this reason, when hydrous titanium oxide is calcined, the portions which have been ion-exchanged with anions or cations do not form the crystal lattice (Ti—O—Ti) of hydrous titanium oxide because of the presence of firmly bonded anions or cations and this does not lead to crystal growth. Moreover, those hydroxyl groups which are near the portions bonded to anions or cations are subject to the influence of steric hindrance of anions or cations and bond with difficulty to the hydroxyl groups on the surface of other hydrous titanium oxide particles.

From a point of view such as this, polyvalent anions or cations which suppress the growth of hydrous titanium oxide particles are capable of bonding to more hydroxyl groups than monovalent anions or cations and they are more effective for interfering with the particle growth of hydrous titanium oxide in the steps for drying and calcining. Now, it is the aforementioned compounds of silicon (Si), phosphorus (P), magnesium (Mg), calcium (Ca), barium (Ba), manganese (Mn), aluminum (Al) and zirconium (Zr) that yield such polyvalent anions or cations and are useful as a particle growth inhibitor of hydrous titanium oxide.

Concrete examples of the aforementioned compounds useful as a particle growth inhibiter of hydrous titanium oxide are the following. The compounds of silicon (Si) are silicon tetrachloride, silicon dioxide, silicic acid, silicate salts, silicic anhydride, molybdenum silicate and silicate ions. The compounds of phosphorus (P) are phosphoric acid, phosphorous acid, metaphosphoric acid, pyrophosphoric acid, phosphorus oxide, ammonium phosphates, calcium phosphates, magnesium phosphates, barium phosphates, potassium phosphates and sodium phosphates. The compounds of magnesium (Mg) are magnesium nitrate, magnesium sulfate, magnesium carbonate, magnesium borate, magnesium acetate, magnesium oxide, magnesium hydroxide, magnesium fluoride, magnesium chloride, magnesium bromide, magnesium iodide, magnesium carbide, organic acids containing magnesium, magnesium, magnesium ions and magnesium molybdate and the hydrates and the like of the aforementioned compounds.

The compounds of calcium (Ca) are calcium nitrate, calcium sulfate, calcium carbonate, calcium borate, calcium acetate, calcium oxide, calcium hydroxide, calcium fluoride, calcium chloride, calcium bromide, calcium iodide, calcium carbide, organic acids containing calcium, calcium, calcium ions and calcium molybdate and the hydrates and the like of the aforementioned compounds. The compounds of barium (Ba) are barium nitrate, barium sulfate, barium carbonate, barium borate, barium acetate, barium oxide, barium hydroxide, barium fluoride, barium chloride, barium bromide, barium iodide, barium carbide, organic acids containing barium, barium, barium ions and barium molybdate and the hydrates and the like of the aforementioned compounds. The compounds of manganese (Mn) are manganese nitrate, manganese sulfate, manganese ammonium sulfate, manganese carbonate, manganese borate, manganese acetate, manganese oxide, manganese hydroxide, manganese fluoride, manganese chloride, manganese bromide, manganese iodide, manganese carbide, organic acid containing manganese, manganese, permanganates and manganese molybdate and the hydrates and the like of the aforementioned compounds.

The compounds of aluminum (Al) are aluminum acetate, ammonium aluminum sulfate, aluminum bromide, aluminum chloride, aluminum fluoride, aluminum hydroxide, aluminum lactate, aluminum nitrate, aluminum perchlorate, potassium aluminum sulfate, aluminum silicate, sodium aluminum sulfate, aluminum sulfate, aluminum trifluoride and aluminum and the hydrates and the like of the aforementioned compounds. The compounds of zirconium (Zr) are zirconium sulfate, sulfated zirconia, zirconium carbide, zirconium tetrachloride, zirconium oxychloride, zirconium hydride, zirconium tetraiodide, zirconium oxide, zirconium n-propoxide, zirconyl nitrate, zirconyl carbonate, zirconyl hydroxide, zirconyl sulfate, zirconyl acetate and zirconium and the hydrates and the like of the aforementioned compounds.

A silicon or phosphorus compound to be added to hydrous titanium oxide as a particle growth inhibiter is stable as oxide and produces a better effect when present in the form of an oxyanion in the aqueous solution. A silicon compound primarily appears to exist as $SiO_3^{2-}$ in the aqueous solution while a phosphorus compound as $PO_4^{3-}$. Compounds of magnesium, calcium, barium, zirconium and manganese with a greater ionization tendency produce a greater effect when present in the form of their cations in the aqueous solution. The aforementioned compounds acting as a particle growth inhibiter are likely to assume the form of $Mg^{2+}$, $Ca^{2+}$, $Ba^{2+}$, $Zr^{4+}$ or $Mn^{2+}$. A compound of aluminum is relatively stable as a hydroxide $Al_2O_3.xH_2O$; moreover, as it can assume the form of either an anion or a cation, it is considered to be present as $AlO_3^{3-}$ in the case of an anion or as $Al^{3+}$ in the case of a cation.

When a compound yielding ions of an element selected from silicon (Si), phosphorus (P), magnesium (Mg), calcium (Ca), barium (Ba), manganese (Mn), aluminum (Al) and zirconium (Zr) is added as a particle growth inhibiter to hydrous titanium oxide, its concentration is not restricted in any specific way; however, where the preparation of porous titanium oxide characterized by a large specific surface area, excellent heat stability, precisely controlled pore size, a sharp pore distribution and a high purity, preferably 97 wt % or more, is aimed at, it is necessary to add the compound to hydrous titanium oxide so that an amount of the compound is in the range of 0.1-3 wt %, preferably in the range of 0.2-2 wt %, of titanium oxide, where the compound is deemed to have a weight of an oxide of the selected element of the compound. When the particle growth inhibiter thus added to hydrous titanium oxide is less than 0.1 wt %, it does not manifest the effect for increasing the specific surface area of titanium oxide sufficiently. Conversely, when the addition exceeds 3 wt %, porous titanium oxide of high purity cannot be obtained and, besides, titanium oxide itself does not increase in specific surface area to any appreciable extent.

The method for adding the aforementioned particle growth inhibiter to a hydrous 4 group metal oxide, for example, hydrous titanium oxide, is not restricted: a particle growth inhibiter may be added to the raw materials (for example, a 4 group metal compound, a pH adjusting agent, an aqueous solvent, etc.) during the preparation of a hydrosol or a hydrogel of hydrous titanium oxide; it may be added to the reaction solvent during synthesis; where a pH swing operation is performed, it may be added to the raw materials 4 group metal compound and pH adjusting agent to be used in the pH swing operation; or it may be added in the step after synthesis and before dehydration.

In the case where hydrous titanium oxide is prepared by neutralizing the raw material titanium chloride with ammonia, impurities such as chlorine and ammonia remain in the hydrosol or hydrogel of such hydrous titanium oxide and these impurities need to be removed by washing with water; washing water containing a given particle growth inhibiter may be used as washing water in the steps for filtration and washing after the synthesis of the aforementioned hydrous titanium oxide, thereby adding the particle growth inhibiter to hydrous titanium oxide through the washing water or gel-like hydrous titanium oxide after washing may be mixed with the particle growth inhibiter. In this case, the concentration of the particle growth inhibiter in washing water is preferably in the range of 1-100 ppm on the basis of the oxide of the element in the particle growth inhibiter. Adoption of these methods can greatly simplify the procedure for adding a particle growth inhibitor to hydrous titanium oxide. Furthermore, a particle growth inhibitor of hydrous titanium oxide may be added to hydrous titanium oxide after a drying treatment.

When polyvalent anions are added as a particle growth inhibitor to hydrous titanium oxide, the pH of the sol or gel of hydrous titanium oxide is preferably controlled at a point below the isoelectric point of hydrous titanium oxide. On the other hand, when polyvalent cations are added as a particle growth inhibitor to hydrous titanium oxide, the pH of the sol or gel of hydrous titanium oxide is preferably controlled at a point above the isoelectric point of hydrous titanium oxide. Moreover, when both polyvalent anions and polyvalent cations are added together as particle growth inhibitors to hydrous titanium oxide, controlling the pH of the sol or gel of hydrous titanium oxide at the isoelectric point of hydrous titanium oxide ±1.0 can cause the particle growth inhibitor to adhere effectively to the sol or gel.

In the case where a particle growth inhibitor is added to a hydrosol, a hydrogel or a dried product hydrous titanium oxide represented by the general formula $TiO_{(2-x)}(OH)_{2x}$ (wherein x is a number greater than 0.1 or x>0.1), the composition formula $TiO_{(2-x)}(OH)_{2x}\cdot yH_2O$ (wherein $0.1 \leq x < 2.0$ and $0.3 \leq y \leq 40$) or the composition formula $TiO_{(2-x)}(OH)_{2x}\cdot yH_2O$ (wherein $0.2 \leq x < 1.0$ and $0.3 \leq y \leq 40$) and the mixture is dried and calcined to give a catalyst supported on titanium oxide which has a specific surface area of 80 m$^2$/g, a pore volume of 0.2 ml/g or more and a pore sharpness degree of 50% or more for use as a hydrotreating catalyst for hydrocarbon oils, a compound yielding ions of an element that shows catalytic activity for hydrotreating is added as the aforementioned particle growth inhibitor and the ions of the element in question undergo an ion exchange with the hydroxyl groups of hydrous titanium oxide.

The compounds to be used for the aforementioned purpose as a particle growth inhibitor are required to be compounds that yield ions of elements possessing catalytic activity for hydrotreating; those compounds which yield ions of the principal catalyst elements molybdenum (Mo) and/or tungsten (W) are indispensable and other compounds yielding ions of elements which act as promoters include compounds containing elements of the 9, 10, 13 and 15 groups, preferably a group of elements composed of iron (Fe), nickel (Ni), cobalt (Co), phosphorus (P), boron (B), platinum (Pt), palladium (Pd), rhodium (Rh) and ruthenium (Ru), more preferably a group of elements composed of cobalt (Co), nickel (Ni), phosphorus (P) and boron (B); these compounds may be used singly or as a mixture of two kinds or more.

The aforementioned compounds to be used as a particle growth inhibitor yield ions in an aqueous solution, either anions or cations, and anions are present as oxyanions such as $MoO_4^{2-}$, $WO_4^{2-}$, $PO_4^{3-}$ and $BO_3^{3-}$ or as metal carbonyl anions while cations are present as metal cations such as $Ni^{2+}$ and $Co^{2+}$. When plural kinds of elements possessing catalytic activity for hydrotreating such as mentioned above are supported on a catalyst carrier, they may be supported on the carrier in succession, one supported repeatedly plural times before another, or they may be supported simultaneously as a mixture on the carrier.

The compounds yielding particularly suitable oxyanions include ammonium molybdates $[(NH_4)_6Mo_7O_{24}\cdot 4H_2O$, $(NH_4)_2MoO_4$, $(NH_4)MoO_7]$, sodium molybdate $(Na_2MoO_4\cdot 2H_2O)$, molybdic acid $(H_2MoO_4$, $H_2MoO_3\cdot H_2O)$, molybdenum pentachloride $MoCl_5)$, silicomolybdic acid $(H_4SiMo_{12}O_{40}\cdot nH_2O)$, tungstic acid $(H_2WO_4)$, ammonium tungstate $[5(NH)_4O\cdot 12WO_3\cdot H_2O$, $3(NH)_2O\cdot 12WO_3\cdot nH_2O]$, sodium tungstate $(Na_2WO_4\cdot 2H_2O)$, $H_3PO_4$, $HPO_3$, $H_4P_2O_7$, $P_2O_5$, $NH_4H_2PO_4$, $(NH_4)_2HPO_4$, $(NH_4)_3PO_4\cdot H_2O$, $H_3[PO_4W_{12}O_{36}]\cdot 5H_2O$ and salts of heteropolyacids containing Mo or W.

The metal salts suitable for yielding metal carbonyl anions include $(NEt_4)[Mo(CO)_5(OOCCH_3)]$, $Mo(CO)_6$—$NEt_3$-EtSH, $Ru_3(CO)_{12}$—$NEt_3$-EtSH, $(\eta\text{-}C_6H_4Me)_2Mo_2Co_2S_3(CO)_4$, $W(CO)_6$ and $W(CO)_6$—$NEt_3$-EtSH. The metal salts suitable for yielding metal cations include nickel nitrate [Ni$(NO_3)_2\cdot 6H_2O$], nickel sulfate $(NiSO_4\cdot 6H_2O)$, nickel chloride $(NiCl_2)$, nickel acetate [Ni$(CH_3CO_2)_2\cdot 4H_2O$], cobalt acetate [Co$(CH_3CO_2)_2\cdot 6H_2O$], cobalt nitrate [Co$(NO_3)_2\cdot 6H_2O$], cobalt sulfate $(CoSO_4\cdot 7H_2O)$ and cobalt chloride $(CoCl_2\cdot 6H_2O)$.

As for the amount of the aforementioned compounds of elements possessing catalytic activity for hydrotreating to be added as a particle growth inhibitor in order to effect an ion exchange with the hydroxyl groups of hydrous titanium oxide, the amount of the principal catalyt element molybdenum (Mo) and/or tungsten (W) to be supported on a catalyst carrier is controlled preferably at 15 wt % or more, more preferably at 20-40 wt %, on the oxide basis and the amount of the total catalyst components to be supported on a catalyst carrier is controlled preferably at 20 wt % or more, more preferably at 30-47 wt %, on the oxide basis in order to increase the selectivity of the denitrogenation reaction thereby improving performance of both desulfurization and denitrogenation. When the amount of the principal catalyst elements molybdenum (Mo) and/or tungsten (W) supported on a catalyst carrier is less than 15 wt %, it is not possible to obtain the desired hydrotreating activity against hydrocarbon oils.

Moreover, in order to obtain a hydrotreating catalyst for hydrocarbon oils which gives an excellent performance m desulfurization and denitrogenation with minimal consumption of hydrogen, the amount of ion exchange is preferably controlled so that it is 0.06-0.46 atom per 1 titanium atom for the principal catalyst element and 0.02-0.26 atom per 1 titanium atom for the promoter element or 0.08-0.82 atom per 1 titanium atom for the sum total of the principal and promoter elements.

Several useful methods such as the following are available for preparing a catalyst supported on titanium oxide possessing the aforementioned catalytic activity for hydrotreating; hydrous titanium oxide is brought into contact with the ions of the principal catalyst element and the ions of the promoter element, either together or separately, to effect ion exchange, then the pH is finally adjusted to a value in the range of 3-9 and the ion-exchanged product is molded, dried and calcined; hydrous titanium oxide is added to a impregnating solution containing the ions of the principal catalyst element and those of the promoter element, ion exchange is effected at pH 1-7 or pH 9-11, and the ion-exchanged product is filtered, molded, dried and calcined; hydrous titanium oxide is brought into contact with the ions of principal catalyst elements consisting of molybdenum (Mo) and/or tungsten (W) and the ions of one kind or more of promoter elements selected from cobalt (Co), nickel (Ni), phosphorus (P) and boron (B) and the ion-exchanged product is filtered, molded, dried and calcined.

A hydrous 4 group metal oxide (hydrous titanium oxide) prepared in the aforementioned manner is then filtered, dehydrated, dried and calcined to give a porous 4 group metal oxide (porous titanium oxide) and here the hydrous 4 group metal oxide is dried or dehydrated to the water content of 200-900 wt %, preferably 250-600 wt %, on the solid basis, molded into a specified configuration, dried at 40-350° C., preferably at 80-200° C., for 0.5-24 hours, preferably 0.5-5 hours, and then calcined at 350-1200° C., preferably at 400-700° C., for 0.5-24 hours, preferably 0.5-10 hours.

The porous 4 group metal oxide of this invention obtained in this manner normally has a pore sharpness degree of 50% or more. Porous titanium oxide or a porous 4 group metal oxide in which the 4 group metal M is titanium (Ti) has a pore sharpness degree of 50% or more and a pore volume of 0.2 mug or more, occasionally 0.3 ml/g or more, even when calcined at 500° C. for 3 hours.

Titanium oxide of this invention supporting an element having catalytic activity for hydrotreating is porous titanium oxide which gives excellent performance in desulfurization and denitrogenation as a hydrotreating catalyst for hydrocarbon oils and is capable of removing both sulfur and nitrogen components from hydrocarbon oils effectively in the presence of hydrogen at a reaction temperature of 280-400° C., a reaction pressure of 2-15 MPa, an LHSV of 0.3-10 hr$^{-1}$ and a hydrogen/oil ratio of 50-500 Nl/l.

PREFERRED EMBODIMENTS OF THE INVENTION

Figure 1:
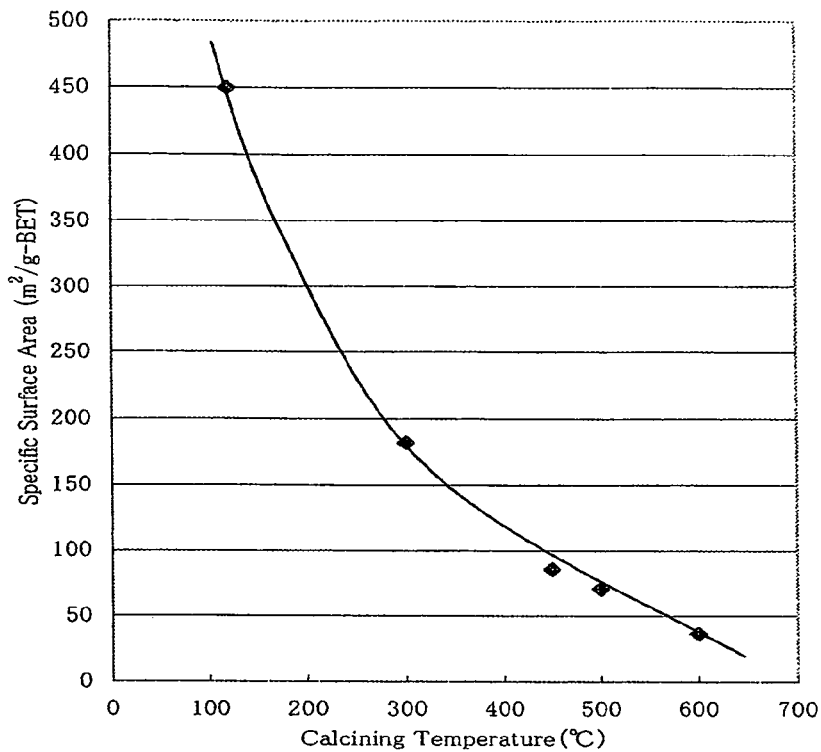
FIG. 1 is a graph illustrating the relationship between the heat treatment temperature and the specific surface area of the titania hydrosol which was obtained in Example 19 and heat-treated before the addition of a particle growth inhibitor.

Suitable modes of practice of this invention will be described concretely below with reference to the accompanying examples and comparative examples.

In this invention, a variety of physical properties of porous titanium oxide and hydrous titanium oxide were determined by the following methods.

[Pore Volume (TPV) and Pore Size Distribution]

The pore volume and pore size distribution of porous titanium oxide were determined by the method based on mercury penetration under pressure with the aid of an instrument, Autopore 9200 available from Shimadzu Corporation. The method is described in detail in E. W. Washburn, Proc. Natl. Acad. Sci., 7, 115 (1921), H. L. Ritter and L. E. Drake, Ind. Eng. Chem. Anal., 17, 782, 787 (1945), L. C. Drake, Ind. Eng. Chem., 41, 780 (1949) and H. P Grace, J. Amer. Inst. Chem. Emgrs., 2, 307 (1965). The measurements were made at a surface tension of mercury of 0.48 N/m and a contact angle of 140° while varying the absolute mercury pressure from 0.08 to 414 MPa.

[Pore Sharpness Degree]

A cumulative pore distribution curve is measured by a mercury porosimeter and the pore diameter at ½ PV of the total pore volume (TPV) or the median diameter is obtained from the ordinate denoting the cumulative pore volume and the abscissa denoting the pore diameter (Å). Following this, the pore volume (PVM) contained in the range of the pore diameter within ±5% of the logarithnic value of the median diameter is obtained and the pore sharpness degree which shows sharpness of pore distribution is obtained from the pore volume (PVM) and the total pore volume (PVT) as follows;

Pore sharpness degree=
[pore volume (*PVM*/total pore volume (*PVT*)]×100.

The pore sharpness degree defined here serves as a factor for evaluating the degree of pores optimal for the reaction relative to the total pore volume and the greater the pore sharpness degree, the sharper the pore distribution becomes or the more favorable the situation becomes.

[Crystal Structure]

The crystal structures of the catalyst and the catalyst carrier were determined by X-ray diffractometry with the aid of an instrument, PW3710 available from Phillips.

[Specific Surface Area]

The three-point BET specific surface area of porous titanium oxide was determined with the aid of an instrument, Macsorb Model 1201 available from Mountec. The method is described in detail in an article by S. Brunauer, P. H. Emmet, and E. Teller, J. Am. Chem. Soc., 60, 309 (1938).

[Pore Volume (TPV)]

The pore volume of porous titanium oxide was determined with the aid of a mercury porosimeter, Autopore 9200 available from Shimadzu Corporation in accordance with the method based on mercury penetration under pressure. The method is described in detail in E. W. Washburn, Proc. Natl. Acad. Sci., 7, 115 (1921), H. L. Ritter and L. E. Drake, Ind. Eng. Chem. Anal., 17, 782, 787 (1945), L. C. Drake, Ind. Eng. Chem., 41, 780 (1949) and H. P. Grace, J. Amer. Inst. Chem. Engrs., 2, 307 (1965). The measurements were made at a surface tension of mercury of 0.48 N/m and a contact angle of 140° while varying the absolute mercury pressure from 0.08 to 414 MPa.

[Pore Asymmetric Coefficient N]

Figure 2:
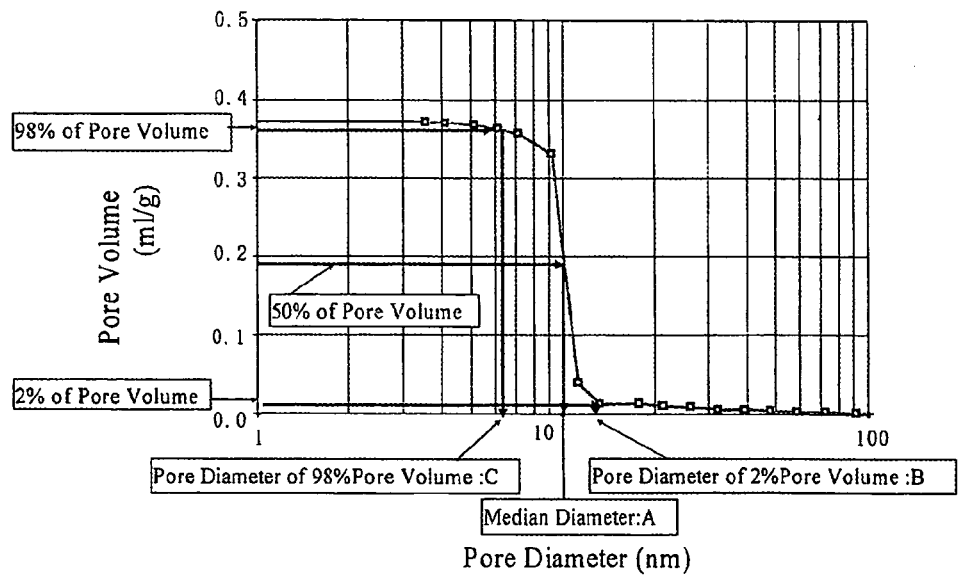
FIG. 2 is a graphic model illustrating the method for obtaining the pore asymmetric coefficient N.

The pore asymmetric coefficient N defined by N=(A–C)/(B–A) was obtained from FIG. 2 showing the relationship between the cumulative pore volume (ordinate) determined by a mercury porosimeter and the pore diameter (abscissa: expressed in logarithm). That is, the logarithmic values of the pore diameter corresponding to the 50% pore volume, 2% pore volume and 98% pore volume were respectively taken as A, B and C and the pore asymmetric coefficient N was expressed as the ratio of the distance between C and A to that between B and A.

[Mechanical Strength (Side Crushing Strength:SCS)]

The mechanical strength (Side Crushing Strength:SCS) was determined with the aid of a Kiya strength tester. A cylindrical extruded form with a length of 6 mm or less was compressed by a disk with a diameter of 10 mm and the mechanical strength was obtained by dividing the load applied at the time of breakage by the length of the cylindrical extruded form as follows;

SCS=*W/L* wherein W (kg) is the load applied at the time of breakage and L (mm) is the length of the cylindrical extruded form.

Example 1

Step for Synthesis of Hydrous Titanium Oxide Particles

Silicon tetrachloride ($SiCl_4$) was used as a particle growth inhibitor of hydrous titanium oxide. To a vessel containing 5500 g of an aqueous solution of silicon tetrachloride (concentration of silicon, 0.29 g/l computed as $SiO_2$) were added 165 g of an aqueous solution of titanium tetrachloride with a concentration of 500 g/l and 166 g of 14 wt % ammonia water to synthesize a hydrosol slurry of hydrous titanium oxide. The temperature for this synthesis was 60° C.

A pH swing operation was performed on the hydrosol slurry of hydrous titanium oxide thus obtained by adding 165 g of an aqueous solution of titanium tetrachoride with a concentration of 500 g/l, returning the pH to the dissolving range of hydrous titanium oxide on the acidic side, and then adding 166 g of 14 wt % ammonia water to shift the pH of the slurry to the precipitating range of hydrous titanium oxide on the alkaline side, and another pH swing operation was performed to give hydrous titanium oxide particles. The pH of the final hydrosol slurry of hydrous titanium oxide was adjusted to 5.
(Steps for Filtration and Washing)

The synthesized hydrosol slurry of hydrous titanium oxide is filtered, washed with 7.5 l of water to remove chlorine and ammonium ions and the procedure of filtration and washing was repeated twice. Finally, filtration by suction gave a gel of hydrous titanium oxide which had a water content (structural water+free water) of 300 wt % on the solid basis.
(Step for Extrusion Molding)

The gel of hydrous titanium oxide synthesized by application of the pH swing operation was molded into a cylindrical form by the use of a piston type gel extrusion molder equipped with a 1.8 mm-diameter die.
(Steps for Drying and Calcining)

The cylindrical molded form of the hydrogel of hydrous titanium oxide obtained in the extrusion molding step was dried in a dryer at 120° C. for 3 hours and the dried form was calcined in an electric oven at 500° C. for 3 hours to give porous titanium oxide. The calcined form was allowed to cool in a desiccator.

The properties of the porous titanium oxide thus obtained are shown in Table 1.

TABLE 1

| | | | Example 1 |
|---|---|---|---|
| Raw material species | | | $TiCl_4$ |
| x in composition formula | | | 0.78 |
| y in composition formula | | | 12.5 |
| Properties | | | |
| | Titanium oxide content | (wt %) | 97.3 |
| | Specific surface area | ($m^2/g$) | 187 |
| | Pore volume (TPV) | (ml/g) | 0.36 |
| | Pore sharpness degree | (%) | 78 |

Example 2

Porous titanium oxide was obtained as in Example 1 with the exception of using an aqueous solution of phosphoric acid (concentration of phosphorus, 0.25 g/l computed as $P_2O_5$) as a particle growth inhibiter of hydrous titanium oxide and setting the synthesis temperature at 80° C.

The properties of the porous titanium oxide thus obtained are shown in Table 2.

Example 3

Porous titanium oxide was obtained as in Example 1 with the exception of using an aqueous solution of magnesium chloride hexahydrate (concentration of magnesium, 0.08 g/l computed as MgO) as a particle growth inhibiter of hydrous titanium oxide, setting the synthesis temperature at 100° C., performing the pH swing operation twice under such conditions as to produce the same amount of hydrous titanium oxide as in Example 1 and adjusting the pH of the final hydrosol slurry of hydrous titanium oxide to 8.

The properties of the porous titanium oxide thus obtained are shown in Table 2.

Example 4

Porous titanium oxide was obtained as in Example 1 with the exception of using an aqueous solution of calcium chloride dihydrate (concentration of calcium, 0.17 g/l computed as CaO) as a particle growth inhibiter of hydrous titanium oxide, setting the synthesis temperature at 120° C., performing the pH swing operation six times under such conditions as to produce the same amount of hydrous titanium oxide as in Example 1 and adjusting the pH of the final hydrosol slurry of hydrous titanium oxide to 8.

The properties of the porous titanium oxide thus obtained are shown in Table 2.

Example 5

Porous titanium oxide was obtained as in Example 1 with the exception of using an aqueous solution of barium chloride dihydrate (concentration of barium, 0.24 g/l computed as BaO) as a particle growth inhibiter of hydrous titanium oxide, setting the synthesis temperature at 140° C. and adjusting the pH of the final hydrosol slurry of hydrous titanium oxide to 8.

The properties of the porous titanium oxide thus obtained are shown in Table 2.

Example 6

Porous titanium oxide was obtained as in Example 1 with the exception of using an aqueous solution of zirconium oxychloride octahydrate (concentration of zirconium, 0.33 g/l computed as $ZrO_2$) as a particle growth inhibiter of hydrous titanium oxide and setting the synthesis temperature at 140° C.

The properties of the porous titanium oxide thus obtained are shown in Table 2.

Example 7

Porous titanium oxide was obtained as in Example 1 with the exception of using an aqueous solution of manganese chloride tetrahydrate (concentration of manganese, 0.22 g/l computed as MnO) as a particle growth inhibiter of hydrous titanium oxide, setting the synthesis temperature at 180° C., performing the pH swing operation twice under such conditions as to produce the same amount of hydrous titanium oxide as in Example 1 and adjusting the pH of the final hydrosol slurry of hydrous titanium oxide to 8.

The properties of the porous titanium oxide thus obtained are shown in Table 2.

Example 8

Porous titanium oxide was obtained as in Example 1 with the exception of using an aqueous solution of aluminum chloride (concentration of aluminum, 0.30 g/l computed as $Al_2O_3$) as a particle growth inhibitor of hydrous titanium oxide, setting the synthesis temperature at 40° C. and adjusting the pH of the final hydrosol slurry of hydrous titanium oxide to 7.

The properties of the porous titanium oxide thus obtained are shown in Table 2.

chloride (concentration of silicon, 0.15 g/l computed as $SiO_2$), calcium chloride dihydrate (concentration of calcium, 0.15 g/l computed as CaO) and magnesium chloride hexahydrate (concentration of magnesium, 0.04 g/l computed as MgO) as a particle growth inhibiter while using the aqueous solution as an aqueous solvent in the step for synthesis, setting the synthesis temperature at 100° C., performing the pH swing operation nine times under such conditions as to produce the same amount of hydrous titanium oxide as in Example 1 and adjusting the pH of the final hydrosol slurry of hydrous titanium oxide to 7.

The properties of the porous titanium oxide thus obtained are shown in Table 3.

Example 12

Porous titanium oxide was obtained as in Example 1 with the exception of preparing the hydrosol slurry of hydrous

TABLE 2

| | | Example 2 | Example 3 | Example 4 | Example 5 | Example 6 | Example 7 | Example 8 |
|---|---|---|---|---|---|---|---|---|
| Raw material species | | $TiCl_4$ | $TiCl_4$ | $TiCl_4$ | $TiCl_4$ | $TiCl_4$ | $TiCl_4$ | $TiCl_4$ |
| x in composition formula | | 0.75 | 0.80 | 0.30 | 0.55 | 0.50 | 0.65 | 1.0 |
| y in composition formula | | 12.5 | 12.5 | 13.0 | 12.7 | 12.8 | 12.6 | 12.3 |
| Properties | Titanium oxide content (wt %) | 97.5 | 98.8 | 97.1 | 97.7 | 97.1 | 97.6 | 97.3 |
| | Specific surface area ($m^2/g$) | 158 | 93 | 97 | 134 | 125 | 100 | 114 |
| | Pore volume (TPV) (ml/g) | 0.33 | 0.33 | 0.80 | 0.34 | 0.33 | 0.42 | 0.37 |
| | Pore sharpness degree (%) | 61 | 70 | 55 | 79 | 76 | 60 | 78 |

In each of the examples in Tables 1 and 2, titanium oxide whose preparation is the target of this invention has a purity of 97 wt % or more, a specific surface area of 80 $m^2/g$ or more, a pore volume (PVT) of 0.3 ml/g or more and a pore sharpness degree of 50% or more.

Example 9

Porous titanium oxide was obtained as in Example 1 with the exception of using an aqueous solution of silicon tetrachloride (concentration of silicon, 0.05 g/l computed as $SiO_2$) as a particle growth inhibiter of hydrous titanium oxide.

The properties of the porous titanium oxide thus obtained are shown in Table 3.

Example 10

Porous titanium oxide was obtained as in Example 1 with the exception of using an aqueous solution of silicon tetrachloride (concentration of silicon, 0.02 g/l computed as $SiO_2$) and phosphoric acid (concentration of phosphorus, 0.09 g/l computed as $P_2O_5$) as particle growth inhibiters of hydrous titanium oxide, setting the synthesis temperature at 80° C. and performing the pH swing operation six times under such conditions as to produce the same amount of hydrous titanium oxide as in Example 1.

The properties of the porous titanium oxide thus obtained are shown in Table 3.

Example 11

Porous titanium oxide was obtained as in Example 1 with the exception of using an aqueous solution of silicon tetratitanium oxide without using a particle growth inhibiter of hydrous titanium oxide and using an aqueous solution of silicon tetrachloride (concentration of silicon, 0.03 g/l computed as $SiO_2$), calcium chloride (concentration of calcium, 0.03 g/l computed as CaO) and magnesium chloride (concentration of magnesium, 0.01 g/l computed as MgO) as washing water in the step for washing the titania hydrogel slurry.

The properties of the porous titanium oxide thus obtained are shown in Table 3.

Example 13

The washed hydrogel of hydrous titanium oxide was obtained as in Example 1 with the exception of not using a particle growth inhibiter of hydrous titanium oxide.

To 50 g as $TiO_2$ of the hydrogel of hydrous titanium oxide [water content (structural water+free water), 300 wt % on the solid basis] was added 0.92 g computed as $P_2O_5$ of ammonium dihydrogen phosphate powders as a particle growth inhibiter and the two were kneaded to give a homogeneous mixture. Thereafter, the same procedure as in Example 1 was followed to give porous titanium oxide.

Example 14

A dried molded form of hydrous titanium oxide corresponding to 50 g as $TiO_2$ was immersed in 200 ml of a solution of phosphoric acid (concentration of phosphorus, 4.8 g/l computed as $P_2O_5$) and thereafter the procedure of Example 1 was followed to give porous titanium oxide.

The properties of the porous titanium oxide thus obtained are shown in Table 3.

TABLE 3

|  |  | Example 9 | Example 10 | Example 11 | Example 12 | Example 13 | Example 14 |
|---|---|---|---|---|---|---|---|
| Raw material species |  | $TiCl_4$ | $TiCl_4$ | $TiCl_4$ | $TiCl_4$ | $TiCl_4$ | $TiCl_4$ |
| x in composition formula |  | 0.78 | 0.35 | 0.13 | 0.78 | 0.78 | 0.78 |
| y in composition formula |  | 12.5 | 12.9 | 13.2 | 12.5 | 12.5 | — |
| Properties | Titanium oxide content (wt %) | 98.4 | 97.4 | 97.1 | 97.6 | 97.4 | 97.4 |
|  | Specific surface area ($m^2$/g) | 109 | 82 | 97 | 146 | 162 | 167 |
|  | Pore volume (TPV) (ml/g) | 0.33 | 0.81 | 0.88 | 0.32 | 0.34 | 0.36 |
|  | Pore sharpness degree (%) | 73 | 63 | 52 | 82 | 60 | 56 |

Examples 10 and 11 relate to the cases where a plurality of particle growth inhibitors of hydrous titanium oxide are added to the synthesis solvent, Example 12 to the case where a particle growth inhibitor of hydrous titanium oxide is added during washing of the gel and Examples 13 and 14 to the cases where a particle growth inhibitor is added to porous titanium oxide by kneading with the hydrous titanium oxide gel or impregnating the dried material. In each case, titanium oxide whose preparation is the target of this invention has a purity of 97 wt % or more, a specific surface area of 80 $m^2$/g or more, a pore volume (PVT) of 0.3 ml/g or more and a pore sharpness degree of 50% or more.

To a vessel containing 2 l of boiled water was added 0.3 l of an aqueous solution of titanium tetrachloride with a concentration of 500 g/l and then 0.4 l of 14 wt % ammonia water was added while keeping the temperature of the liquid at 95° C. to give a hydrosol slurry of hydrous titanium oxide. Thereafter, addition of the aqueous solution of titanium tetrachloride and the ammonia water was repeated twice under the boiling condition to give hydrous titanium oxide particles. The pH of the final hydrosol slurry of hydrous titanium oxide was adjusted to 7. Thereafter, the same procedure as in Example 1 was followed to give porous titanium oxide.

The properties of the porous titanium oxide thus obtained are shown in Table 4.

Comparative Example 1

Porous titanium oxide was obtained as in Example 1 with the exception of synthesizing hydrous titanium oxide only in one reaction in an amount corresponding to that obtained after three pH swing operations in Example 1 without using a particle growth inhibitor of hydrous titanium oxide and without performing a pH swing operation and adjusting the pH of the hydrosol slurry of hydrous titanium oxide to 7.

The properties of the porous titanium oxide thus obtained are shown in Table 4.

Comparative Example 2

Porous titanium oxide was obtained as in Example 1 with the exception of using an aqueous solution of silicon tetrachloride with a concentration of 0.009 g/l computed as $SiO_2$ in the step for the synthesis of hydrous titanium oxide.

The properties of the porous titanium oxide thus obtained are shown in Table 4.

Comparative Example 3

Porous titanium oxide was obtained as in Example 1 with the exception of using an aqueous solution of silicon tetrachloride with a concentration of 0.60 g/l computed as $SiO_2$ in the step for the synthesis of hydrous titanium oxide.

The properties of the porous titanium oxide thus obtained are shown in Table 4.

Comparative Example 4

Porous titanium oxide was obtained as in Example 1 with the exception of adjusting the pH of the final hydrosol slurry of hydrous titanium oxide to 8 in the step for the synthesis of hydrous titanium oxide.

The properties of the porous titanium oxide thus obtained are shown in Table 4.

Comparative Example 5

Porous titanium oxide was obtained as in Example 1 with the exception of using an aqueous solution of magnesium chloride with a concentration of 0.08 g/l computed as MgO in the step for the synthesis of hydrous titanium oxide and adjusting the pH of the final hydrosol slurry of hydrous titanium oxide to 4.

The properties of the porous titanium oxide thus obtained are shown in Table 4.

TABLE 4

|  |  | Comparative Example 1 | Comparative Example 2 | Comparative Example 3 | Comparative Example 4 | Comparative Example 5 |
|---|---|---|---|---|---|---|
| Raw material species |  | $TiCl_4$ | $TiCl_4$ | $TiCl_4$ | $TiCl_4$ | $TiCl_4$ |
| x in composition formula |  | 1.30 | 0.75 | 0.75 | 0.75 | 0.75 |
| y in composition formula |  | 12.0 | 12.5 | 12.5 | 12.5 | 12.5 |
| Properties | Titanium oxide content (wt %) | 99.2 | 99.2 | 95.4 | 88.9 | 99.2 |
|  | Specific surface area ($m^2$/g) | 60 | 67 | 199 | 224 | 78 |
|  | Pore volume (TPV) (ml/g) | 0.16 | 0.15 | 0.28 | 0.36 | 0.17 |
|  | Pore sharpness degree (%) | 71 | 75 | 48 | 45 | 74 |

The porous titanium oxide in Comparative Example 1 in Table 4 was prepared without addition of a particle growth inhibitor of hydrous titanium oxide. The specific surface area in Comparative Example 1 is less than 80 m²/g. Comparative Example 2 relates to the case where the addition of a particle growth inhibitor is less than 0.1 wt % and the specific surface area is less than 80 m²/g while Comparative Examples 3 and 4 relate to the case where the addition of a particle growth inhibitor is more than 3 wt % and the purity of titanium oxide is less than 97 wt %. Comparative Example 5 relates to the case where a particle growth inhibitor of hydrous titanium oxide which is presumably present as polyvalent cations in the synthesis solvent or magnesium chloride hexahydrate was added and the pH of the final hydrosol slurry of hydrous titanium oxide was adjusted to 4 which is lower than the isoelectric point of anatase crystals and it is seen that very little magnesium was taken into titanium oxide under this condition.

The effect of adding a particle growth inhibitor of hydrous titanium oxide will be explained on the basis of the results obtained in Examples 1 and 9 and Comparative Examples 2 through 4.

To a vessel containing 5500 g of water was added 150 g of an aqueous solution of sodium silicate with a concentration of 100 g/l, then the pH was adjusted to 4 by adding a 20 wt % aqueous solution of sulfuric acid to give a hydrosol slurry of hydrous silicon oxide. Thereafter, the same adding procedure as the foregoing was repeated twice or the pH swing operation was repeated three times to give a hydrosol slurry of hydrous silicon oxide. After this, the procedure of Example 1 was followed to give porous silicon oxide. The porous silicon oxide with a purity of 99.4 wt % thus obtained had a specific surface area of 650 m²/g. The specific surface area of a mixture of this high-purity porous silicon oxide and the porous titanium oxide with a purity of 99.2 wt % prepared in Comparative Example 2 can be expressed by the mix ratio of silicon oxide and titanium oxide.

Porous titanium oxide of Examples 1 and 9 and Comparative Examples 2 through 4 contains porous silicon oxide originating in silicon tetrachloride added as a particle growth inhibitor of hydrous titanium oxide during the synthesis. Therefore, the effect of increasing the specific surface area produced by a particle growth inhibitor of hydrous titanium oxide alone exclusive of the same effect produced by the added silicon tetrachloride can be expressed by the difference in specific surface area (an increment of specific surface area) between mixtures of high-purity titanium oxide and high-purity silicon oxide prepared in the same ratio as in Examples 1 and 9 and Comparative Examples 2 through 4.

In order to confirm the effect of adding a particle growth inhibitor of hydrous titanium oxide alone in Examples 1 and 9 and Comparative Examples 2 through 4, an increment of specific surface area was obtained by subtracting the specific surface area originating in silicon oxide and corresponding to the content of silicon oxide in porous titanium oxide in Examples 1 and 9 and Comparative Examples 2 through 4.

Figure 3:
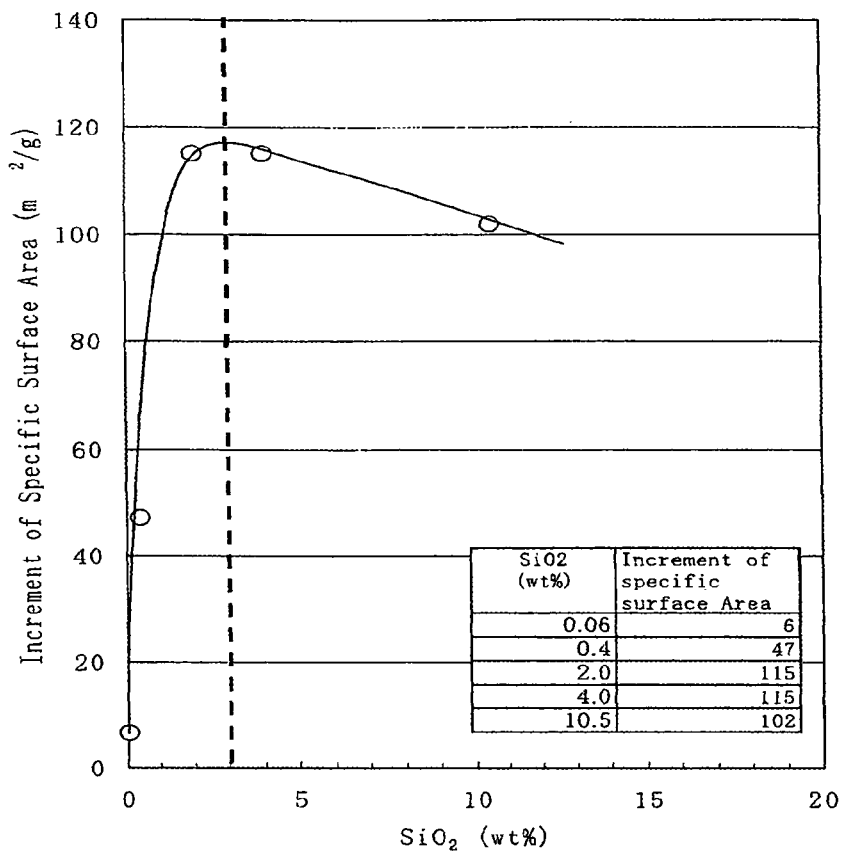
FIG. 3 is a graph investigating the effect of adding a particle growth inhibitor to hydrous titanium oxide by the use of porous titanium oxide of Examples 1 and 9 and Comparative Examples 2 through 4.

The results are shown in FIG. 3 in which the content of silicon oxide in porous titanium oxide is plotted on the x axis and the increment of specific surface area on the y axis.

As is apparent from FIG. 3, the increment of specific surface area is large until the content of silicon oxide reaches 3 wt % and the incremet is particularly pronounced up to 2 wt %; thus it is seen that a particle growth inhibitor of hydrous titanium oxide manifests a considerable effect for increasing the specific surface area. However, where the content of silicon oxide is less than 0.1 wt % as in the case of Comparative Example 2, a specific surface area of 80 m²/g or more which is the target of this invention is not attained. The effect for increasing the specific surface area gradually decreases as the content of silicon oxide exceeds 3 wt % and addition of a particle growth inhibitor of hydrous titanium oxide in excess of this value produces a smaller effect.

Example 15

Step for Synthesis of Hydrous Titanium Oxide Particles

To 11 kg of water was added 330 g of an aqueous solution of titanium tetrachloride with a concentration of 500 g/l to adjust the pH of the synthesis solution to 1.5, and 340 ml of 14 wt % ammonia water was added to shift the pH to 6.5 and give a hydrosol slurry of hydrous titanium oxide. The temperature during this synthesis was 60° C.

To the hydrosol slurry of hydrous titanium oxide was added 300 g of an aqueous solution of titanium tetrachloride with a concentration of 500 g/l to return the pH of the slurry to 1.5 or to the acidic side of hydrous titanium oxide, then 355 ml of 14 wt % ammonia water was added to shift the pH of the slurry to 6.3 near the isoelectric point of hydrous titanium oxide, and this pH swing operation was repeated twice or four times to give hydrous titanium oxide particles.

The hydrous titanium oxide thus synthesized was subjected to the steps for filtration and washing, the step for extrusion molding and the steps for drying and calcining described in the aforementioned Example 1 to give porous titanium oxide.

The properties of the porous titanium oxide prepared from the hydrous titanium oxide are shown in Table 5.

TABLE 5

|  |  |  | Example 15 | |
| --- | --- | --- | --- | --- |
| Raw material species |  |  | TiCl₄ | TiCl₄ |
|  | Number of pH swing operations |  | 2 | 4 |
| x in composition formula |  |  | — | — |
| y in composition formula |  |  | — | — |
| Properties | Specific surface area | (m²/g) | 183 | 168 |
|  | Pore volume (TPV) | (ml/g) | 0.25 | 0.43 |
|  | Pore sharpness degree | (%) | 78 | 63 |
|  | Pore asymmetric coefficient (N) | (—) | 1.71 | 1.92 |
|  | Mechanical strength (SCS) | (kg/mm) | 1.0 | 0.6 |
|  | Median diameter | (nm) | 6.4 | 9.9 |

Example 16

To 11 kg of water was added 330 g of an aqueous solution of titanium tetrachoride with a concentration of 500 g/l to adjust the pH of the synthesis solution to 1.5, and 355 ml of 14 wt % ammonia water was added to shift the pH to 7.5 and give a hydrosol slurry of hydrous titanium oxide. The temperature during this synthesis was 75° C.

To the hydrosol slurry of hydrous titanium oxide was added 330 g of an aqueous solution of titanium tetrachloride with a concentration of 500 g/l to return the pH of the slurry to 1.5 or to the acidic side of hydrous titanium oxide, then 355 ml of 14 wt % ammonia water was added to shift the pH of the slurry over the isoelectric point of hydrous titanium oxide to 7.5, and this pH swing operation was repeated four times to give hydrous titanium oxide particles.

Porous titanium oxide was prepared from the hydrous titanium oxide as in the aforementioned Example 15. The properties of the porous titanium oxide thus obtained are shown in Table 5.

Example 17

To 11 kg of water was added 300 ml of 14 wt % ammonia water to adjust the pH to 9, and the pH swing operation was performed five times in total between pH 3.8 on the acidic side and pH 7.5 over the isoelectric point of hydrous titanium oxide by the use of 330 g of an aqueous solution of titanium tetrachloride with a concentration of 500 g/l and 355 ml of 14 wt % ammonia water to give porous titanium oxide as in Example 15 with the exception of spending approximately 2 minutes at pH 6 during the pH swing operation. The properties of the porous titanium oxide thus obtained are shown in Table 6.

Example 18

To 11 kg of water was added NaOH to adjust the pH to 11.5, then an aqueous solution of titanium tetrachloride with a concentration of 500 g/l was added to shift the pH to 5.8 and this pH swing operation was repeated three times in total while following the rest of the procedure in Example 15 to give porous titanium oxide. The properties of the porous titanium oxide thus obtained are shown in Table 6.

TABLE 6

|  |  |  | Example 16 | Example 17 | Example 18 |
|---|---|---|---|---|---|
| Raw material species |  |  | TiCl$_4$ | TiCl$_4$ | TiCl$_4$ |
| x in composition formula |  |  | — | — | — |
| y in composition formula |  |  | — | — | — |
| Properties | Specific surface area | (m$^2$/g) | 176 | 125 | 169 |
|  | Pore volume (TPV) | (ml/g) | 0.29 | 0.23 | 0.30 |
|  | Pore sharpness degree | (%) | 65 | 61 | 62 |
|  | Pore asymmetric coefficient (N) | (—) | 3.46 | 3 | 3.3 |
|  | Mechanical strength (SCS) | (kg/mm) | 0.9 | 1.1 | 0.8 |
|  | Median diameter | (nm) | 7.2 | 9.0 | 7.1 |

Comparative Example 6

Porous titanium oxide was prepared as in Example 15 with the exception of performing the pH swing operation between pH 2.0 in the low pH range and pH 4.5 in the high pH range four times in total by the use of 330 g of an aqueous solution of titanium tetrachloride with a concentration of 500 g/l and 355 ml of 14 wt % ammonia water. The properties of the porous titanium oxide thus obtained are shown in Table 7.

Comparative Example 7

Porous titanium oxide was prepared as in Example 15 with the exception of performing the pH swing operation between pH 4.5 in the low pH range and pH 6.5 in the high pH range four times in total by the use of 330 g of an aqueous solution of titanium tetrachloride with a concentration of 500 g/l and 355 ml of 14 wt % ammonia water. The properties of the porous titanium oxide thus obtained are shown in Table 7.

Comparative Example 8

Porous titanium oxide was prepared as in Example 15 with the exception of preparing a hydrosol slurry of hydrous titanium oxide by adding 355 ml of 14 wt % ammonia water and then adding 330 g of an aqueous solution of titanium tetrachloride with a concentration of 500 g/l and performing the pH swing operation between pH 9.5 in the alkali range and pH 7.5 in the low pH range four times in total by the use of 355 ml of 14 wt % ammonia water and 330 g of an aqueous solution of titanium tetrachloride with a concentration of 500 g/l. The properties of the porous titanium oxide thus obtained are shown in Table 7.

TABLE 7

|  |  |  | Comparative Example 6 | Comparative Example 7 | Comparative Example 8 |
|---|---|---|---|---|---|
| Raw material species |  |  | $TiCl_4$ | $TiCl_4$ | $TiCl_4$ |
| x in composition formula |  |  | — | — | — |
| y in composition formula |  |  | — | — | — |
| Properties | Specific surface area | (m²/g) | 105 | 146 | 115 |
|  | Pore volume (TPV) | (ml/g) | 0.15 | 0.32 | 0.15 |
|  | Pore sharpness degree | (%) | 43 | 40 | 48 |
|  | Pore asymmetric coefficient (N) | (—) | 5 | 6 | 5.2 |
|  | Mechanical strength (SCS) | (kg/mm) | 0.8 | 0.4 | 0.9 |
|  | Median diameter | (nm) | 6.7 | 13.0 | 6.3 |

(Step for Synthesis of Hydrous Titanium Oxide Particles)

To 10 kg of pure water was added 1500 g of an aqueous solution of titanium tetrachloride with a concentration of 210 g/l to adjust the pH of the synthesis solution to 0.5, and then 2300 g of 14 wt % ammonia water was added to shift the pH to 7.0 and give a hydrosol slurry of hydrous titanium oxide. The temperature during this synthesis was 60° C.

To the hydrosol slurry of hydrous titanium oxide thus obtained was added 1500 g of an aqueous solution of titanium tetrachloride with a concentration of 500 g/l to return the pH to 0.5 in the acid range of hydrous titanium oxide (hydrosol dissolving pH range), 2800 ml of 14 wt % ammonia water was added to shift the pH to 7.0 (hydrosol precipitating pH range), and this pH swing operation was repeated five times in total to give hydrous titanium oxide particles.

(Steps for Filtration and Washing)

Following the completion of the aforementioned step for synthesis of hydrosol the hydrosol was filtered, the resulting cake was washed with pure water repeatedly until the absence of chlorine (Cl⁻) in the filtrate was confirmed by titration with silver nitrate to give titania hydrosol.

(Step for Preparation of Dried Form)

The titania hydrosol obtained in the aforementioned manner was filtered by suction, dehydrated until the water content (structural water+free water) becomes approximately 50 wt %, molded by the use of a 1.8 mm-diameter die, and dried at 120° C. for 3 hours to give a dried molded form of titania.

(Step for Adding a Particle Growth Inhibiter)

The dried molded form of titania obtained above was immersed in an aqueous solution of ammonium paramolybdate with a concentration corresponding to 16.3 wt % of titanium oxide on the oxide basis, left standing at room temperature for 2 hours and filtered through a filter paper 5C to give molybdenum supported on titania.

(Steps for Drying and Calcining)

The molybdenum supported on titania was dried at 120° C. for 3 hours and then calcined at 500° C. for 3 hours to give a molybdenum catalyst supported on titania.

The properties of the molybdenum catalyst supported on titania are shown in Table 8.

Example 20

The hydrosol after washing in Example 19 was immersed in an aqueous solution of ammonium paramolybdate with a concentration corresponding to 16.3 wt % of titanium oxide on the oxide basis, left standing at room temperature for 2 hours, filtered by suction, and dehydrated until the water content (structural water+free water) reached 400 wt %. Molding by the use of a 1.5 mm-diameter die followed and the molded form was dried at 120° C. for 3 hours and then calcined at 500° C. for 3 hours to give a molybdenum catalyst supported on titania.

The properties of the catalyst thus obtained are shown in Table 8.

Example 21

A cobalt-molybdenum catalyst supported on titania was prepared as in Example 20 with the exception of using simultaneously cobalt nitrate and ammonium paramolybdate as particle growth inhibiters, respectively in an amount corresponding to 3.0 wt % and 10.0 wt % of titanium oxide on the oxide basis.

The properties of the catalyst thus obtained are shown in Table 8.

Example 22

The hydrosol after filtration in Example 19 was immersed in an aqueous solution of phosphoric add, ammonium paramolybdate and cobalt nitrate as particle growth inhibiters, respectively in an amount corresponding to 2.0 wt %, 8.0 wt % and 2.9 wt % of titanium oxide on the oxide basis, left standing at room temperature for 2 hours, filtered by suction, and dehydrated until the water content (structural water+free water) reached 400 wt % on the solid basis. Molding by the use of a 1.8 mm-diameter die followed and the molded form was dried at 120° C. for 3 hours and then calcined at 500° C. for 3 hours to give a phosphorus-molybdenum-cobalt catalyst supported on titania.

The properties of the catalyst thus obtained are shown in Table 8.

TABLE 8

|  |  |  | Example 19 | Example 20 | Example 21 | Example 22 |
|---|---|---|---|---|---|---|
| Raw material species |  |  | $TiCl_4$ | $TiCl_4$ | $TiCl_4$ | $TiCl_4$ |
| x in composition formula |  |  | 0.21 | 0.53 | 0.53 | 0.53 |
| y in composition formula |  |  | 0.3 | 17.2 | 17.2 | 17.2 |
| Properties | Specific surface area | (m²/g) | 129 | 142 | 115 | 149 |
|  | Pore volume (TPV) | (ml/g) | 0.42 | 0.35 | 0.33 | 0.41 |
|  | Pore sharpness degree | (%) | 54 | 65 | — | — |

Example 23

A phosphorus-molybdenum-nickel catalyst supported on titania was prepared as in Example 22 with the exception of using simultaneously phosphoric acid, ammonium paramolybdate and nickel nitrate as particle growth inhibiters, respectively in an amount corresponding to 2.0 wt %, 8.0 wt % and 2.0 wt % of titanium oxide on the oxide basis.

The properties of the catalyst thus obtained are shown in Table 9.

Example 24

A nickel-molybdenum-cobalt catalyst supported on titania was prepared as in Example 22 with the exception of using simultaneously nickel nitrate, ammonium paramolybdate and cobalt nitrate as particle growth inhibiters, respectively in an amount corresponding to 2.0 wt %, 8.0 wt % and 2.0 wt % of titanium oxide on the oxide basis.

The properties of the catalyst thus obtained are shown in Table 9.

Example 25

A phosphorus-tungsten-nickel catalyst supported on titania was prepared as in Example 20 with the exception of using simultaneously phosphorus, ammonium metatungstate and nickel nitrate as particle growth inhibiters, respectively in an amount corresponding to 2.0 wt %, 8.0 wt % and 2.0 wt % of titanium oxide on the oxide basis.

The properties of the catalyst thus obtained are shown in Table 9.

Example 26

Following the procedure of Example 19, zirconium oxychloride was used as a raw material and a hydrogel of zirconia after filtration was immersed in an aqueous solution containing ammonium paramolybdate in an amount corresponding to 16.3 wt % of zirconium oxide on the oxide basis, left standing at room temperature for 2 hours, filtered by suction and dehydrated until the water content (structural water+free water) became 400 wt % on the solid basis. Molding by the use of a 1.5 mm-diameter die followed and the resulting molded form was dried at 120° C. for 3 hours and then calcined at 500° C. for 3 hours to give a molybdenum catalyst supported on zirconia.

The properties of the catalyst thus obtained are shown in Table 9.

TABLE 9

| | | | Example 23 | Example 24 | Example 25 | Example 26 |
|---|---|---|---|---|---|---|
| Raw material species | | | TiCl$_4$ | TiCl$_4$ | TiCl$_4$ | Zirconium oxychloride |
| x in composition formula | | | 0.53 | 0.53 | 0.53 | 0.30 |
| y in composition formula | | | 17.2 | 17.2 | 17.2 | 17.4 |
| Properties | Specific surface area | (m$^2$/g) | 167 | 105 | 133 | 103 |
| | Pore volume (TPV) | (ml/g) | 0.31 | 0.46 | 0.38 | 0.43 |
| | Pore sharpness degree | (%) | — | — | — | — |

Comparative Example 9

The dried molded form of titania obtained in Example 19 before addition of a particle growth inhibitor was calcined at 500° C. to give a titania carrier.

The properties of the titania carrier thus obtained are shown in Table 10.

Comparative Example 10

A molybdenum catalyst supported on titania was prepared as in Example 19 with the exception of drying the molded form of titania obtained in Example 19 before addition of a particle growth inhibitor at 370° C., adjusting the water content of the hydrous oxide to a lower level and adding ammonium paramolybdate as a particle growth inhibitor in an amount corresponding to 16.3 wt % of titanium oxide on the oxide basis.

The properties of the catalyst thus obtained are shown in Table 10.

TABLE 10

| | | | Comparative Example 9 | Comparative Example 10 |
|---|---|---|---|---|
| Raw material species | | | TiCl$_4$ | TiCl$_4$ |
| x in composition formula | | | 0.53 | 0.01 |
| y in composition formula | | | — | 0 |
| Properties | Specific surface area | (m$^2$/g) | 71 | 54 |
| | Pore volume (TPV) | (ml/g) | 0.36 | 0.41 |
| | Pore sharpness degree | (%) | 51 | 45 |

Example 27

Step for Synthesis of Hydrous Titanium Oxide Particles

To 10 kg of pure water was added 1500 g of an aqueous solution of titanium tetrachloride with a concentration of 210 g/l to adjust the pH of the synthesis solution to 0.5 and then 2300 g of 14 wt % ammonia water was added to shift the pH to 7.0 and give a hydrosol slurry of hydrous titanium oxide. The temperature during this synthesis was 80° C.

To the hydrosol slurry of hydrous titanium oxide thus obtained was added 1500 g of an aqueous solution of titanium tetrachloride with a concentration of 500 g/l to return the pH of the slurry to 0.5 in the acid range of hydrous titanium oxide hydrosol dissolving pH range), then 2800 ml of 14 wt % ammonia water was added to return the pH of the slurry to 7.0 (hydrosol precipitating pH range), this pH swing operation was repeated five times in total, the hydrogel was filtered and the resulting cake was washed with pure water repeatedly until the absence of chlorine ion (Cl⁻) was confirmed by titration with silver nitrate, and the cake was filtered and dehydrated at room temperature until the water content (structural water+free water) became approximately 300 wt % on the solid basis to give a dehydrated hydrogel of hydrous titanium oxide.

(Ion Exchange with Ions Containing Catalyst Components)

To the hydrogel of hydrous titanium oxide thus obtained was added an aqueous solution containing 30 wt % of ammonium paramolybdate [$(NH_4)_6Mo_7O_{24} \cdot 6H_2O$], 4 wt % of phosphoric acid ($H_3PO_4$) and 4 wt % of cobalt nitrate [$Co(NO_3)_2 \cdot 6H_2O$] and the mixture was kneaded in a kneader at room temperature for 2 hours to give an ion-exchanged intimate mixture.

(Molding, Drying and Calcining of Catalyst)

The mixture was molded into a cylindrical form by the use of a 2.4 mm-diameter die, the molded form was dried at 120° C. for 3 hours and then calcined at 500° C. for 3 hours to give a hydrotreating catalyst composed of the catalyst components supported on titanium oxide.

The properties of the hydrotreating catalyst obtained in Example 27 are shown in Table 11.

Example 28

A hydrotreating catalyst composed of the catalyst components supported on titanium oxide was prepared as in the aforementioned Example 27 with the exception of preparing a hydrogel of hydrous titanium oxide by adding an aqueous solution of titanium tetrachloride and an aqueous solution of ammonia without performing a pH swing operation and then adding to this hydrogel of hydrous titanium oxide the ions of the catalyst yielding 37 wt % of molybdenum ($MoO_3$), 5 wt % of cobalt (CoO) and 5 wt % of phosphorus ($P_2O_5$) on the oxide basis.

The properties of the hydrotreating catalyst obtained in Example 28 are shown in Table 11.

Example 29

A hydrotreating catalyst composed of the catalyst components supported on titanium oxide was prepared as in the aforementioned Example 27 with the exception of preparing a hydrogel of hydrous titanium oxide by repeating the procedure of adding an aqueous solution of titanium tetrachloride and an aqueous solution of ammonia (pH swing operation) seven times in total and then adding to this hydrogel of hydrous titanium oxide the ions of the catalyst components yielding 20 wt % of molybdenum ($MoO_3$), 4 wt % of cobalt (CoO) and 7 wt % of phosphorus ($P_2O_5$) on the oxide basis.

The properties of the hydrotreating catalyst obtained in Example 29 are shown in Table 11.

Example 30

A hydrotreating catalyst composed of the catalyst components supported on titanium oxide was prepared as in the aforementioned Example 27 with the exception of preparing a hydrogel of hydrous titanium oxide by repeating the procedure of adding an aqueous solution of titanium tetrachloride and an aqueous solution of ammonia (pH swing operation) 12 times in total and then adding to this hydrogel of hydrous titanium oxide the ions of the catalyst components yielding 23 wt % of molybdenum $MoO_3$), 4 wt % of cobalt (CoO) and 5 wt % of phosphorus ($P_2O_5$) on the oxide basis.

The properties of the hydrotreating catalyst obtained in Example 30 are shown in Table 11.

Example 31

A hydrotreating catalyst composed of the catalyst components supported on titanium oxide was prepared as in the aforementioned Example 27 with the exception of preparing a hydrogel of hydrous titanium oxide by repeating the procedure of adding an aqueous solution of titanium tetrachloride and an aqueous solution of ammonia (pH swing operation) four times in total and then adding to this hydrogel of hydrous titanium oxide the ions of the catalyst components yielding 25 wt % of tungsten ($WO_3$) and 5 wt % of cobalt (CoO) on the oxide basis.

The properties of the hydrotreating catalyst obtained in Example 31 are shown in Table 11.

Example 32

A hydrotreating catalyst composed of the catalyst components supported on titanium oxide was prepared as in the aforementioned Example 27 with the exception of preparing a hydrogel of hydrous titanium oxide by repeating the procedure of adding an aqueous solution of titanium tetrachloride and an aqueous solution of ammonia (pH swing operation) seven times in total and then adding to this hydrogel of hydrous titanium oxide the ions of the catalyst components yielding 30 wt % of molybdenum ($MoO_3$), 4 wt % of cobalt (CoO) and 3 wt % of boron ($B_2O_3$) on the oxide basis.

The properties of the hydrotreating catalyst obtained in Example 32 are shown in Table 11.

TABLE 11

| | | | Example 27 | Example 28 | Example 29 | Example 30 | Example 31 | Example 32 |
|---|---|---|---|---|---|---|---|---|
| Raw material species | | | $TiCl_4$ | $TiCl_4$ | $TiCl_4$ | $TiCl_4$ | $TiCl_4$ | $TiCl_4$ |
| x in composition formula | | | 0.33 | 1.83 | 0.24 | 0.15 | 0.34 | 0.28 |
| y in composition formula | | | 13.0 | 11.5 | 13.1 | 13.1 | 13.0 | 13.0 |
| Properties | Specific surface area | ($m^2/g$) | 112 | 121 | 156 | 132 | 113 | 141 |
| | Pore volume (TPV) | (ml/g) | 0.35 | 0.23 | 0.47 | 0.26 | 0.32 | 0.33 |
| | Pore sharpness degree | (%) | 70 | 80 | 54 | 52 | 70 | 65 |
| Results of reaction | Relative desulfurization activity | (—) | 2.6 | 3.4 | 2.0 | 2.3 | 2.0 | 2.3 |
| | Relative denitrification activity | (—) | 3.5 | 4.3 | 2.9 | 3.4 | 3.0 | 3.2 |
| | Hydrogen consumption | (Nl/l) | 42 | 44 | 38 | 41 | — | — |

Comparative Example 11

The catalyst used was a commercial cobalt-molybdenum-phosphorus catalyst supported on alumina (5.1 wt % CoO/20.0 wt % $MoO_3$/1.1 wt % $P_2O_5$) with a BET specific surface area of 241 $m^2$/g for use in deep hydrodesulfurization of gas oil.

The properties of the hydrotreating catalyt used in Comparative Example 11 are shown in Table 12.

Comparative Example 12

The catalyst used was a commercial nickel-molybdenum catalyst supported on alumina (3.6 wt % NiO/20.4 wt % $MoO_3$) with a BET specific surface area of 241 $m^2$/g for use in deep hydrodesulfurization of gas oil and differed in composition of the catalyst components from the one in the aforementioned Comparative Example 11.

The properties of the hydrotreating catalyt used in Comparative Example 12 are shown in Table 12.

Comparative Example 13

The hydrogel of hydrous titanium oxide obtained in Example 27 was molded, the molded form was dried at 120° C. for 3 hours and then calcined at 500° C. for 3 hours, the calcined form was impregnated with the same aqueous solution (of the ions containing the catalyst components) as used in Example 27, dried at 120° C. for 3 hours and then calcined at 500° C. for 3 hours to give a hydrotreating catalyst composed of the catalyst components supported on titanium oxide.

The properties of the hydrotreating catalyt obtained in Comparative Example 13 are shown in Table 12.

Comparative Example 14

A hydrotreating catalyst composed of the catalyst components supported on titanium oxide was prepared as in the aforementioned Example 27 with the exception of preparing a hydrogel of hydrous titanium oxide by repeating the procedure of adding an aqueous solution of titanium tetrachloride and an aqueous solution of ammonia (pH swing operation) 20 times in total and then adding to this hydrogel of hydrous titanium oxide the ions of the catalyst components yielding 28 wt % of molybdenum ($MoO_3$), 4 wt % of cobalt (CoO) and 4 wt % of phosphorus $P_2O_5$) on the oxide basis.

The properties of the hydrotreating catalyst obtained in Comparative Example 14 are shown in Table 12.

Comparative Examples 15

A hydrotreating catalyst composed of the catalyst components supported on titanium oxide was prepared as in the aforementioned Example 27 with the exception of preparing a hydrogel of hydrous titanium oxide by repeating the procedure of adding an aqueous solution of titanium tetrachloride and an aqueous solution of ammonia (pH swing operation) seven times in total and then adding to this hydrogel of hydrous titanium oxide the ions of the catalyst components yielding 14 wt % of molybdenum ($MoO_3$), 4 wt % of cobalt (CoO) and 3 wt % of phosphorus ($P_2O_5$) on the oxide basis.

The properties of the hydrotreating catalyst obtained in Comparative Example 15 are shown in Table 12.

TABLE 12

| | | | Comparative Example 11 | Comparative Example 12 | Comparative Example 13 | Comparative Example 14 | Comparative Example 15 |
|---|---|---|---|---|---|---|---|
| Raw material species | | | — | — | $TiCl_4$ | $TiCl_4$ | $TiCl_4$ |
| x in composition formula | | | — | — | 0.01 | 0.12 | 0.25 |
| y in composition formula | | | — | — | 0 | 13.2 | 13 |
| Properties | Specific surface area | ($m^2$/g) | 241 | 237 | 110 | 66 | 165 |
| | Pore volume (TPV) | (ml/g) | 0.51 | 0.41 | 0.36 | 0.22 | 0.48 |
| | Pore sharpness degree | (%) | — | — | 68.2 | 46.2 | 53.8 |
| Results of reaction | Relative desulfurization activity | (—) | 1.0 | 1.1 | 1.3 | 1.2 | 0.8 |
| | Relative denitrification activity | (—) | 1.0 | 2.1 | 2.3 | 1.9 | 1.9 |
| | Hydrogen consumption | (Nl/l) | 41 | 53 | — | — | 38 |

Test Example 1

Hydrotreating Test of Light Gas Oil

The tests were conducted on hydrotreating of Middle East straight-run light gas oil by the use of the hydrotreating catalysts of Example 27-32 and Comparative Example 11-15 and the performance of the catalyst was examined. The light gas oil has the following properties: specific gravity (15/4° C.), 0.850; sulfur contents, 1.37 wt %; nitrogen contents, 101 ppm; distillation properties, initial boiling point 232° C., 50% boiling point 295° C., 90% boiling point 348° C.

The light gas oil was subjected to a hydrotreating in a high-pressure flow type reactor under the following conditions: reaction pressure, 5.0 MPa; reaction temperature, 350° C.; liquid hourly space velocity, 2.0 $hr^{-1}$; hydrogen/oil ratio, 250 Nl/l. All the catalysts used in the tests were submitted to presulfiding by the use of light gas oil whose content of sulfur components had been adjusted to 2.5 wt % by adding dimethyl disulfide.

Regarding the results of the hydroprocessing tests, the reaction rate constant was obtained while regarding the desulfurization reaction as 1.2th order reaction and the denitrogenation reaction as the 1st order reaction and the results were expressed in a relative value with the results of Comparative Example 11 taken as "1.0." Moreover, the consumption of hydrogen (Nl/l) was obtained.

The results are shown in Tables 11 and 12.

(Relationship Between Nitrogen Removal and Hydrogen Consumption)

The relationship between the degree of nitrogen removal and the consumption of hydrogen was investigated on the catalysts composed of the catalyst components supported on titanium oxide (titania catalysts) of the aforementioned Examples 27 through 30 and the alumina catalysts of Comparative Examples 11 and 12. The results are shown in Tables 11 and 12.

As is apparent from Tables 11 and 12, the catalysts of this invention in Examples 27 through 30 show the denitrogenation activity approximately three times as high as that of the Co/Mo catalyst supported on alumina of Comparative Example 11 and yet consume a comparable amount of hydrogen; further, they show the denitrogenation activity approximately 1.5 times as high as that of the Ni/Mo catalyst supported on alumina of Comparative Example 12 which is considered to show a relatively high hydrotreating activity, and yet their consumption of hydrogen is lower by 10 Nl/l than the Ni/Mo/alumina catalyst.

Thus, it is clear that the titania catalysts of Examples 27 through 30 can sharply reduce the consumption of hydrogen.

(Relationship Between Sulfur Removal and Nitrogen Removal)

The relationship between the degree of sulfur removal and the degree of nitrogen removal was investigated on the catalysts composed of the catalyst components supported on titanium oxide (titania catalysts) of the aforementioned Examples 27 through 30, the Co/Mo/alumina catalyst of Comparative Example 11 and the Ni/Mo/alumina catalyst of Comparative Example 12.

Figure 4:
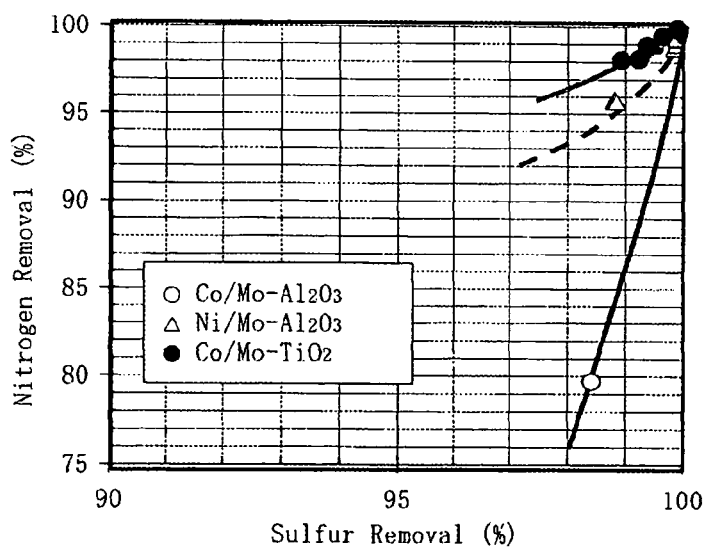
FIG. 4 is a graph illustrating the relationship between the sulfur removal and the nitrogen removal in hydroprocessing by the use of the titania catalyst of Examples 27 through 30 and 32, the Co/Mo-alumina catalyst of Comparative Example 11 and the Ni/Mo-alumina of Comparative Example 12.

As the results shown in FIG. 4 indicate, the titania catalysts of the Examples are highly selective toward denitrogenation and they are suitable for use as a hydrotreating catalyst in hydroprocessing aimed at both desulfurization and denitrogenation.

Example 33

Step for Synthesis of Hydrous Titanium Oxide Particles

To 10 kg of pure water was added 1500 g of an aqueous solution of titanium tetrachloride with a concentration of 210 g/l to adjust the pH of the synthesis solution to 0.5 and then 2300 g of 14 wt % ammonia water was added to shift the pH to 7.0 and give a hydrosol slurry of hydrous titanium oxide. The temperature during this synthesis was 60° C.

To the hydrosol slurry of hydrous titanium oxide thus obtained was added 1500 g of an aqueous solution of titanium tetrachloride with a concentration of 500 g/l to return the pH of the slurry to 0.5 in the acid range of hydrous titanium oxide hydrosol dissolving pH range), then 2800 ml of 14 wt % ammonia water was added to return the pH of the slurry to 7.0 (hydrosol precipitating pH range), this pH swing operation was repeated three times in total, the hydrogel was filtered and the resulting cake was washed with pure water repeatedly until the absence of chlorine ion (Cl$^-$) was confirmed by titration with silver nitrate, and the cake was filtered and dehydrated at room temperature until the water content (structural water+free water) became approximately 300 wt % on the solid basis to give a dehydrated hydrogel of hydrous titanium oxide.

(Ion Exchange with Ions Containing Catalyst Components)

To the hydrous titanium oxide obtained above were added 0.26 atom of ammonium paramolybdate [$(NH_4)_6Mo_7O_{24} \cdot 4H_2O$], 0.05 atom of phosphoric acid ($H_3PO_4$) and 0.06 atom of cobalt nitrate [$Co(NO_3)_2 \cdot 6H_2O$] per 1 atom of titanium and the mixture was kneaded in a kneader at room temperature for 2 hours. The pH at this time was 6.5.

(Molding, Drying and Calcining)

The hydrous titanium oxide ion-exchanged with the catalyst components was molded into a cylindrical form by the use of a 2.4 mm-diameter die, the molded form was dried at 120° C. for 3 hours and then calcined at 500° C. for 3 hours to give a hydrotreating catalyst of Example 33. The properties of this hydrotreating catalyst are shown in Table 13.

Example 34

The hydrous titanium oxide obtained in Example 33 was thrown into a solution of pH 9 containing 0.47 atom of ammonium paramolybdate [$(NH_4)Mo_7O_{24} \cdot 4H_2O$], 0.06 atom of phosphoric acid ($H_3PO_4$) and 0.10 atom of cobalt nitrate [$Co(NO_3)_2 \cdot 6H_2O$] per 1 atom of titanium and dispersed with stirring for 3 hours to effect an ion exchange.

Thereafter, the ion-exchanged hydrous titanium oxide was filtered, dehydrated and processed as in Example 33 to give a hydrotreating catalyst of Example 34. The properties of the catalyst obtained are shown in Table 13.

Example 35

Hydrous titanium oxide was synthesized as in the aforementioned Example 33 with the exception of synthesizing hydrous titanium oxide by swinging the pH alternately between the hydrous titanium oxide dissolving pH range (pH=0.5) and the precipitating pH range (pH=7.0) seven times. The hydrous titanium oxide was filtered by compression to give a cake of hydrous titanium oxide with a water content (structural water+free water) of approximately 10 wt % on the solid basis.

To this hydrous titanium oxide were added 0.16 atom of ammonium paramolybdate [$(NH_4)_6Mo_7O_{24} \cdot 4H_2O$], 0.11 atom of phosphoric acid ($H_3PO_4$) and 0.06 atom of cobalt nitrate [$Co(NO_3)_2 \cdot 6H_2O$] per 1 atom of titanium and the mixture was processed as in Example 33 to give a hydrotreating catalyst of Example 35.

The properties of this catalyst are shown in Table 13.

Example 36

Hydrous titanium oxide was synthesized as in Example 33, washed, filtered and dehydrated in a vacuum filter. The water content (structural water+free water) of the hydrous titanium oxide thus obtained was approximately 400 wt % on the solid basis. To this hydrous titanium oxide were added 0.16 atom of ammonium paramolybdate [$(NH_4)_6Mo_7O_{24} \cdot 4HO$], 0.12 atom of phosphoric acid ($H_3PO_4$) and 0.05 atom of cobalt nitrate [$Co(NO_3)_2 \cdot 6H_2O$] per 1 atom of titanium and the mixture was processed as in Example 33 to give a hydrotreating catalyst. The properties of this catalyst are shown in Table 13.

Example 37

A hydrotreating catalyst was prepared as in the aforementioned Example 33 with the exception of adding to the hydrous titanium oxide 0.12 atom of ammonium tungstate [$(NH_4)_2WO_4$] and 0.08 atom of cobalt nitrate [$Co(NO_3)_2 \cdot 6H_2O$] per 1 atom of titanium. The properties of this catalyst are shown in Table 13.

Example 38

A hydrotreating catalyst was prepared as in the aforementioned Example 33 with the exception of adding to the hydrous titanium oxide 0.38 atom of ammonium paramolybdate [$(NH_4)_6Mo_7O_{24} \cdot 4H_2O$], 0.16 atom of boric acid ($H_3BO_3$) and 0.06 atom of cobalt nitrate [$Co(NO_3)_2 \cdot 6H_2O$] per 1 atom of titanium. The properties of this catalyst are shown in Table 13.

Figure 5:
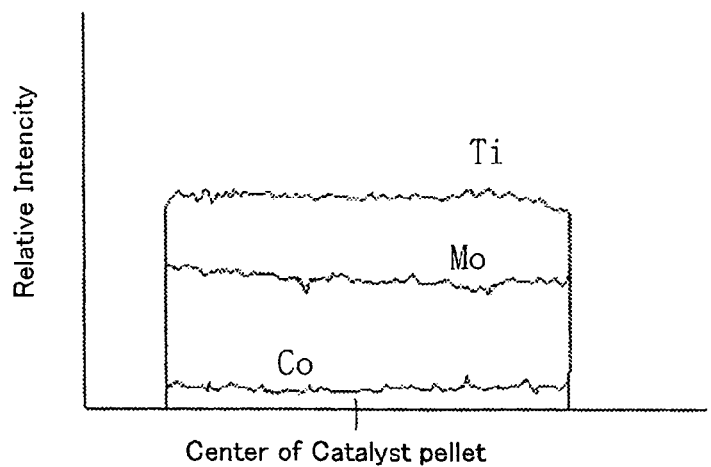
FIG. 5 is a graph showing the results of electron probe microanalysis (EPMA) of the hydrotreating catalyst obtained in Example 38.

Furthermore, the hydrotreating catalyst obtained in Example 38 here was submitted to electron probe microanalysis (EPMA) with the aid of an instrument JXA-8900 available from JOEL Ltd. The results shown in FIG. 5 indicate that 0.38 atom of molybdenum is supported on 1 atom of titanium and, in spite of this high rate, molybdenum is supported uniformly in the pores.

Figure 6:
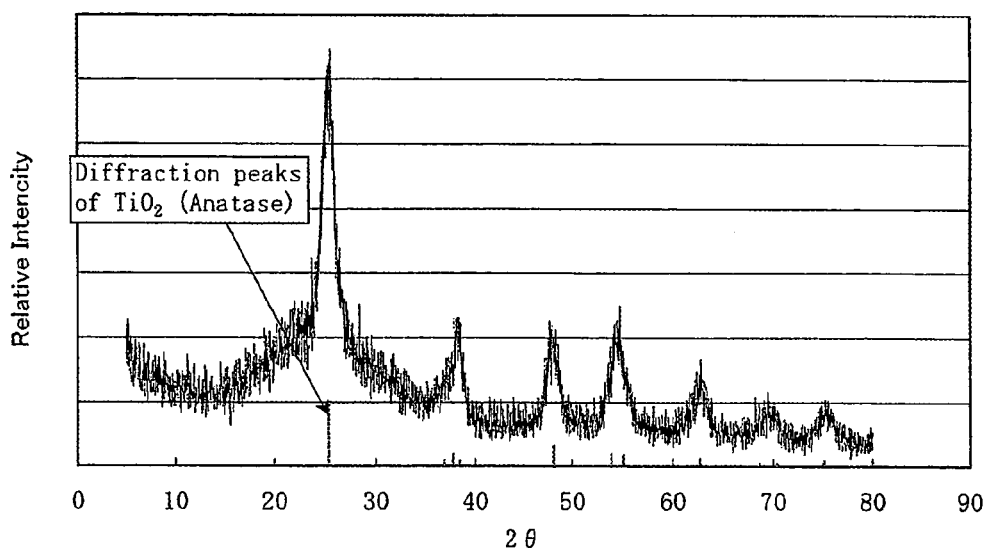
FIG. 6 is a graph showing the X-ray diffraction pattern of the hydrotreating catalyst obtained in Example 38.
Figure 7:
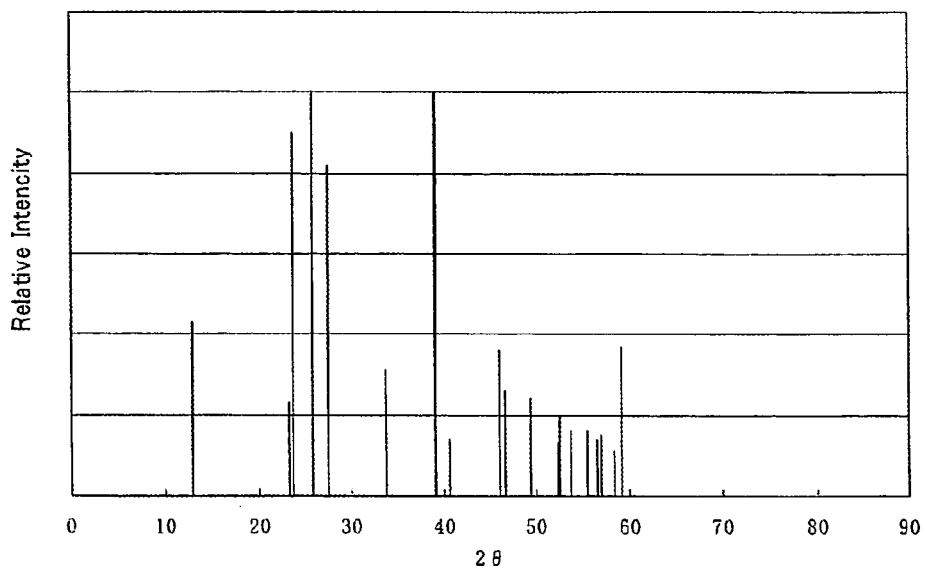
FIG. 7 is a graph showing the X-ray diffraction pattern of molybdenum oxide ($MoO_3$).

Furthermore, X-ray diffraction patterns were measured on the hydrotreating catalyst obtained in Example 38 and molybdenum oxide ($MoO_3$) with the aid of an X-ray difractomer PW3710 available from Phillip. The hydrotreating catalyst of Example 38 gave the results shown in FIG. 6 while molybdenum oxide ($MoO_3$) gave the results shown in FIG. 7. In the former, if molybdenum were present as molybdenum oxide ($MoO_3$) on the catalyst carrier, a diffraction pattern of $MoO_3$ would be bound to appear. However, no such diffraction pattern is observed for the catalyst of Example 38 shown in FIG. 6. This indicates that molybdenum is coordinated to titanium oxide crystals and not merely present in layers on the surface of the catalyst carrier.

Comparative Example 16

Hydrous titanium oxide was synthesized as in Example 33 with the exception of preparing hydrous titanium oxide by setting the synthesis temperature at 95° C. and swinging the pH alternately between the hydrous titanium oxide dissolving pH range (pH=0.5) and the precipitating pH range (pH=7.0) nine times. The hydrous titanium oxide thus obtained was washed, filtered and dried at 120° C. for 10 hours.

The water content (structural water+free water) of the dried hydrous titanium oxide was 0.5 wt % on the solid basis.

A hydrotreating catalyst was prepared as in Example 33 from the hydrous titanium oxide obtained above. The properties of this catalyst are shown in Table 14.

Comparative Example 17

To a 30-l vessel equipped with a stirrer was introduced 10 l of water, 1.5 l of the aqueous solution of titanium tetrachloride prepared in Example 33 was added with stirring to lower the pH to 0.5. To this solution was added 2.3 l of 14 wt % ammonia water to raise the pH to 7.0 and stirred there for approximately 5 minutes. The precipitate thereby formed was washed and filtered to give hydrous titanium oxide.

This hydrosol is amorphous and its water content (structural water+free water) was approximately 1000 wt % on the solid basis.

This hydrosol could not be molded because of its too high water content.

Comparative Example 18

A hydrotreating catalyst was prepared as in the aforementioned Example 33 with the exception of adding 0.05 atom of ammonium tungstate [$(NH_4)_2WO_4$] and 0.019 atom of cobalt nitrate [$Co(NO_3)_2.6H_2O$] per 1 atom of titanium. The properties of the catalyst obtained are shown in Table 14.

Comparative Example 19

A hydrotreating catalyst was prepared as in the aforementioned Example 33 with the exception of adding 0.62 atom of ammonium paramolybdate [$(NH_4)_6Mo_7O_{24}.4H_2O$] and 0.27 atom of cobalt nitrate [$Co(NO_3)_2.6H_2O$] per 1 atom of titanium. The properties of the catalyst obtained are shown in Table 14.

Test Example 2

Hydrotreating Test of Light Gas Oil

The tests were conducted on hydrotreating of Middle East straight-run light gas oil by the use of the hydrotreating catalysts of the aforementioned Examples 33 through 38 and Comparative Examples 16, 18 and 19 and the performance of the catalyst was examined. The light gas oil has the following properties: specific gravity (15/4° C.), 0.850; sulfur contents, 1.37 wt %; nitrogen contents, 101 ppm distillation properties, initial boiling point 232° C., 50% boiling point 295° C., 90% boiling point 348° C.

The light gas oil was hydrotreated in a flow type reactor under the following conditions: reaction pressure, 5.0 MPa; reaction temperature, 350° C.; liquid hourly space velocity, 2.0 $hr^{-1}$; hydrogen/oil ratio, 250 Nl/l. In these hydrotreating tests, the catalysts were submitted to presulfiding by the use of light gas oil whose content of sulfur components had been adjusted to 2.5 wt % by adding dimethyl disulfide.

Regarding the results of the hydroprocessing tests, the reaction rate constant was obtained while regarding the desulfurization reaction as 1.2th order reaction and the denitrogenation reaction as the 1st order reaction and the results were expressed in a relative value with the results of Comparative Example 11 taken as "1." The results are shown in Tables 13 and 14.

TABLE 13

|  |  |  | Example 33 | Example 34 | Example 35 | Example 36 | Example 37 | Example 38 |
|---|---|---|---|---|---|---|---|---|
| Raw material species |  |  | $TiCl_4$ | $TiCl_4$ | $TiCl_4$ | $TiCl_4$ | $TiCl_4$ | $TiCl_4$ |
| x in composition formula |  |  | 0.67 | 0.67 | 0.50 | 0.98 | 0.67 | 0.67 |
| y in composition formula |  |  | 5.75 | 5.75 | 0.39 | 17.74 | 5.75 | 5.75 |
| Properties | Specific surface area | ($m^2$/g) | 102 | 156 | 154 | 155 | 157 | 156 |
|  | Pore volume (TPV) | (ml/g) | 0.35 | 0.47 | 0.46 | 0.47 | 0.40 | 0.49 |
|  | Pore sharpness degree | (%) | 54 | 70 | 55 | 54 | 60 | 59 |
| Results of reaction | Relative desulfurization activity | (—) | 2.5 | 2.3 | 2.1 | 2.0 | 2.0 | 2.5 |
|  | Relative denitrification activity | (—) | 3.5 | 3.3 | 3.0 | 3.2 | 3.0 | 3.3 |

TABLE 14

|  |  |  | Comparative Example 16 | Comparative Example 17 | Comparative Example 18 | Comparative Example 19 |
|---|---|---|---|---|---|---|
| Raw material species |  |  | $TiCl_4$ | $TiCl_4$ | $TiCl_4$ | $TiCl_4$ |
| x in composition formula |  |  | 0.14 | 1.11 | 0.67 | 0.67 |
| y in composition formula |  |  | 0.02 | 27.1 | 5.75 | 5.75 |
| Properties | Specific surface area | ($m^2$/g) | 65 | — | 113 | 50 |
|  | Pore volume (TPV) | (ml/g) | 0.63 | — | 0.39 | 0.19 |
|  | Pore sharpness degree | (%) | 42 | — | 55 | 49 |
| Results of reaction | Relative desulfurization activity | (—) | 1.2 | — | 0.8 | 1.3 |
|  | Relative denitrification activity | (—) | 2.1 | — | 1.8 | 2.2 |

(Relationship Between Degree of Nitrogen Removal and Consumption of Hydrogen)

Figure 8:
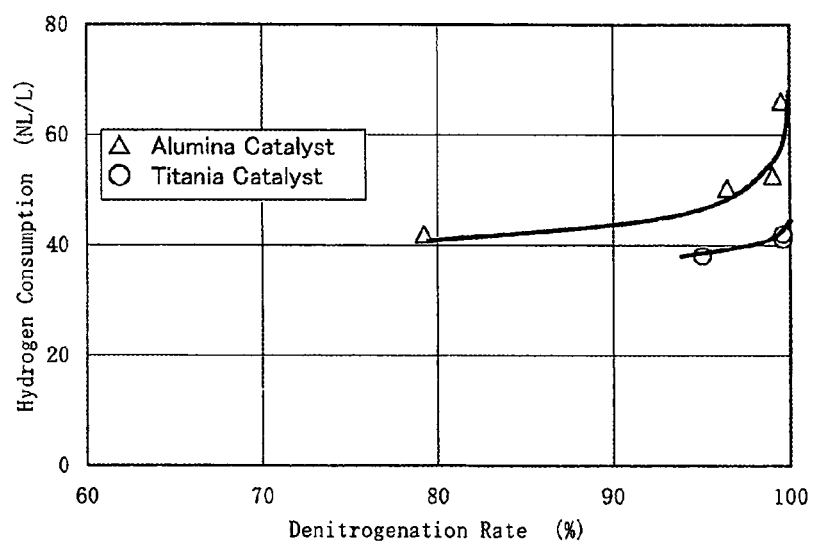
FIG. 8 is a graph illustrating the relationship between the nitrogen removal and the hydrogen consumption obtained in the tests conducted on the titania catalyst of Examples 33 and 34 and the alumina catalyst of Comparative Examples 11 and 12 by varying the liquid hourly space velocity in the range of 1-3.0 hr$^{-1}$.

The relationship between the degree of nitrogen removal and the consumption of hydrogen was investigated by the use of the hydrotreating catalysts (titania catalysts) of the aforementioned Examples 33 and 34 and the commercial catalysts (alumina catalysts) of Comparative Examples 11 and 12 while varying the liquid hourly space velocity in the range from 1 to 3 $hr^{-1}$. The results are shown in FIG. 8 and it is seen that the consumption of hydrogen can be reduced sharply in the case of the titania catalysts of Examples 33 and 34.

Explanation of Examples and Comparative Examples

As is apparent from the results shown in Tables 13 and 14 relating to the aforementioned Test Example 2, the hydrotreating catalysts of Examples 33 through 38 show the desulfurization activity approximately twice or more and, in addition, the denitrogenation activity approximately three times or more that of the commercial catalyst of Comparative Example 11. Furthermore, they show approximately 1.8-fold desulfurization activity or more and approximately 1.5-fold denitrogenation activity or more compared with the commercial catalyst of Comparative Example 12. For all that, FIG. 8 shows that they consume less hydrogen than the catalysts of Comparative Examples of 11 and 12.

The results in Comparative Examples 16 through 19 indicate that, in the case where the content of structural water and free water of hydrous titanium oxide is small (Comparative Example 16), an ion exchange with the catalyst components does not proceed sufficiently and both the desulfurization activity and the denitrogenation activity are not sufficient and on the same order as those in Comparative Example 12. On the other hand, in the case where the content of structural water and free water is excessively large (Comparative Example 17), the molding operation required for the preparation of catalysts cannot be performed. Moreover, in the case where the amounts of the principal catalyst component tungsten and the promoter component nickel supported on the carrier are insufficient (Comparative Example 18), no improvement in desulfurization activity was observed. Still further, in the case where the amount of the principal catalyst component molybdenum is excessive (Comparative Example 19), such excess was found to be not effective for improving the desulfurization activity and the denitrogenation activity.

INDUSTRIAL APPLICABILITY

According to this invention, it is possible to prepare easily a porous 4 group metal oxide which not only has a large specific surface area but also exhibits excellent heat stability. Moreover, it is possible to prepare easily a porous 4 group metal oxide which is characterized by excellent reaction selectivity, a large specific surface area, high catalytic activity and excellent heat stability and useful for a catalyst or a catalyst carrier based on a 4 group metal by the use of a hydrosol of a hydrous 4 group metal oxide having a controlled and sharp pore distribution.

Furthermore, high-purity porous titanium oxide of this invention has properties such as a large specific surface area, excellent heat stability, precisely controlled pore diameter and sharp pore distribution and is useful for applications specifically requiring titanium oxide as a catalyst or a catalyst carrier.

Further, according to this invention, it is possible to prepare porous titanium oxide which is controlled to have pore distribution in a shape conforming to the molecular weight distribution of the reactants at an arbitrary pore diameter, has a larger specific surface area than porous titanium oxide in uniform spherical particles and exhibits excellent mechanical strength and it is possible to prepare porous titanium oxide which is tailored to the purpose and use as a catalyst carrier or a catalyst.

According to this invention, it is possible to provide a hydrotreating catalyst with excellent performance in desulfurization and denitrogenation with minimal consumption of hydrogen and the catalyst is suitable not only for hydroprocessing of hydrocarbon oils, particularly of gas oil and the like which require superdeep desulfurization and deep denitrogenation, but also advantageously applicable to hydroprocessing involving lower degrees of desulfurization and denitrogenation of other hydrocarbon oils.

What is claimed is:

1. A method for preparing a porous titanium oxide which comprises:

adding a particle growth inhibitor to a hydrosol, a hydrogel or a dried product of a hydrous titanium oxide obtained by the reaction of a titanium compound as a raw material with a pH adjusting agent in an aqueous solvent and represented by the general formula $TiO_{(2-x)}(OH)_{2x} \cdot yH_2O$ (wherein $0.1 \leq x < 2.0$ and $0.3 \leq y \leq 40$) so as to inhibit growth of a titanium oxide particle; and drying and calcining a mixture obtained by adding the particle growth inhibitor to the hydrosol, the hydrogel or the dried product of the hydrous titanium oxide so as to yield a titanium oxide which has a specific surface area of 80 $m^2$/g or more, a pore volume of 0.2 ml/g or more and a pore sharpness degree of 50% or more, wherein the particle growth inhibitor is a compound yielding ions containing at least one element selected from silicon (Si), magnesium (Mg), calcium (Ca) and manganese (Mn);

wherein the particle growth inhibitor is added together with the titanium compound as a raw material to the reaction solvent during the synthesis of the hydrous titanium oxide, after the synthesis and before the dehydration of the hydrous titanium oxide or after the dehydration and before the calcination of the hydrous titanium oxide; and
wherein the particle growth inhibitor is added to the hydrous titanium oxide so that an amount of the particle growth inhibitor is in a range of 0.1-3 wt % of the titanium oxide, where the particle growth inhibitor is deemed to have a weight of an oxide of the selected element for a calculation purpose.

2. A method for preparing a porous titanium oxide as described in claim 1 wherein the hydrous titanium oxide is represented by the composition formula $$TiO_{(2-x)}(OH)_{2x} \cdot yH_2O \text{ (wherein } 0.2 \leq x < 1.0 \text{ and } 0.3 \leq y \leq 40).$$

3. A method for preparing a porous titanium oxide as described in claim 1 wherein the hydrous titanium oxide is obtained by using a titanium compound as a raw material and a pH adjusting agent and performing a pH swing operation alternately plural times between the precipitating pH range and the dissolving pH range of the hydrous titanium oxide in a synthesis solvent.

4. A method for preparing a porous titanium oxide as described in claim 1 wherein the hydrous titanium oxide is synthesized by using a titanium compound as a raw material and a pH adjusting agent and performing a pH swing operation in a synthesis solvent in the non-dissolving pH range of the hydrous titanium oxide alternately plural times between the range on the low pH side ($1<pH \leq 4$) and the pH range near the isoelectric point of the hydrous titanium oxide ($5.1 \leq pH \leq 7.1$) or between the pH range near the isoelectric point of the hydrous titanium oxide ($5.1 \leq pH \leq 7.1$) and the range on the high pH side ($8 \leq pH \leq 12$).

5. A method for preparing a porous titanium oxide as described in claim 1 wherein the hydrous titanium oxide is synthesized by using a titanium compound as a raw material and a pH adjusting agent and performing a pH swing operation in a synthesis solvent in the non-dissolving pH range of the hydrous titanium oxide between the range on the low pH side ($1<pH \leq 4$) and the range across the pH range near the isoelectric point ($5.1 \leq pH \leq 7.1$) or between the range on the high pH side ($8 \leq pH \leq 12$) and the range across the pH range near the isoelectric point ($5.1 \leq pH \leq 7.1$) while allowing a sufficient aging time for growth of particles in the range near the isoelectric point ($5.1 \leq pH \leq 7.1$).

6. A method for preparing a porous titanium oxide as described claim 1 wherein the particle growth inhibitor is added at a pH less than the isoelectric point of the hydrous titanium oxide if the particle growth inhibitor is anionic, the particle growth inhibitor is added at a pH more than the isoelectric point of the hydrous titanium oxide if the particle growth inhibitor is cationic, or the particle growth inhibitor is added at a pH corresponding to the isoelectric point of the hydrous titanium oxide ±1.0 in case the particle growth inhibitor has anionic and cationic components which are simultaneously added.

7. A method for preparing a porous titanium oxide as described in claim 1 wherein the yield titanium oxide has a specific surface area of 80 m$^2$/g or more, a pore volume of 0.2 ml/g or more, a pore sharpness degree of 50%, and a purity of 97 wt %.

8. A method for preparing a porous titanium oxide as described claim 1 wherein the hydrous titanium oxide is obtained through a neutralization followed by a step of washing, and the particle growth inhibitor is added by washing the hydrous titanium oxide with washing water containing the particle growth inhibitor during the step of washing.

9. A method for preparing a porous titanium oxide as described in claim 8 wherein washing water to be used in the step of washing of the hydrous titanium oxide contains the particle growth inhibitor in an amount in the range of 1-100 ppm on the oxide basis of the metal contained in the particle growth inhibitor.

10. A method for preparing a porous titanium oxide as described in claim 1 wherein a compound that yields ions of elements possessing catalytic activity for hydrotreating is added to the hydrosol, the hydrogel or the dried product of a hydrous titanium oxide together with the particle growth inhibitor.

11. A method for preparing a porous titanium oxide as described in claim 10 wherein the elements possessing catalytic activity for hydrotreating are principal catalyst element molybdenum (Mo) and/or tungsten (W), together with one or more promoter elements selected from cobalt (Co), nickel (Ni), phosphorus (P) and boron (B).

12. A method for preparing a porous titanium oxide as described in claim 10 wherein the hydroxyl groups of the hydrous titanium oxide are exchanged by the ions of the elements possessing catalytic activity for hydrotreating.

* * * * *